United States Patent
Togo

(10) Patent No.: US 11,830,675 B2
(45) Date of Patent: Nov. 28, 2023

(54) MULTILAYER CERAMIC CAPACITOR

(71) Applicant: Murata Manufacturing Co., Ltd., Nagaokakyo (JP)

(72) Inventor: Kenichi Togo, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 119 days.

(21) Appl. No.: 17/403,914

(22) Filed: Aug. 17, 2021

(65) Prior Publication Data
US 2022/0068562 A1 Mar. 3, 2022

(30) Foreign Application Priority Data

Sep. 3, 2020 (JP) .................................. 2020-148588

(51) Int. Cl.
| | | |
|---|---|---|
| *H01G 4/012* | (2006.01) | |
| *H01G 4/232* | (2006.01) | |
| *H01G 2/06* | (2006.01) | |
| *H01G 4/12* | (2006.01) | |
| *H01G 4/008* | (2006.01) | |
| *H01G 4/30* | (2006.01) | |

(52) U.S. Cl.
CPC ............ *H01G 4/012* (2013.01); *H01G 2/065* (2013.01); *H01G 4/008* (2013.01); *H01G 4/1218* (2013.01); *H01G 4/232* (2013.01); *H01G 4/30* (2013.01)

(58) Field of Classification Search
CPC ........ H01G 4/012; H01G 2/065; H01G 4/008; H01G 4/1218; H01G 4/232; H01G 4/30
See application file for complete search history.

(56) References Cited

U.S. PATENT DOCUMENTS

| | | | |
|---|---|---|---|
| 2008/0186652 A1 | 8/2008 | Lee et al. | |
| 2015/0047890 A1* | 2/2015 | Lee ........................ | H01G 4/248 361/301.4 |
| 2015/0083477 A1* | 3/2015 | Lee .......................... | H01G 4/30 361/301.4 |
| 2015/0090485 A1* | 4/2015 | Lee ........................ | H01G 4/232 361/301.4 |

(Continued)

FOREIGN PATENT DOCUMENTS

| | | |
|---|---|---|
| JP | 2008-193055 A | 8/2008 |
| JP | 2014-241452 A | 12/2014 |
| JP | 2015-026843 A | 2/2015 |

*Primary Examiner* — Michael P McFadden
(74) *Attorney, Agent, or Firm* — KEATING & BENNETT, LLP

(57) ABSTRACT

A multilayer ceramic capacitor includes a multilayer body, a first outer electrode on a first main surface closer to a first end surface, a second outer electrode on the first main surface closer to a second end surface, a third outer electrode on the first main surface between the first outer electrode and the second outer electrode, a first inner electrode layer connected to the first outer electrode and the second outer electrode via a first lead electrode and a second lead electrode, and a second inner electrode layer connected to the third outer electrode via a third lead electrode. When a length of the first lead electrode and a length of the second lead electrode in the length direction are each denoted by a, and a length of the third lead electrode in the length direction is denoted by b, b/a is about 0.5 to about 0.83.

18 Claims, 13 Drawing Sheets

(56) References Cited

U.S. PATENT DOCUMENTS

| | | | |
|---|---|---|---|
| 2015/0109718 A1* | 4/2015 | Choi | H01G 4/30 |
| | | | 174/258 |
| 2015/0114705 A1* | 4/2015 | Ahn | H01G 4/30 |
| | | | 361/301.4 |
| 2015/0243438 A1* | 8/2015 | Ahn | H01G 2/065 |
| | | | 174/258 |
| 2016/0049241 A1 | 2/2016 | Uno et al. | |

* cited by examiner

IV-IV SECTIONAL VIEW

V-V SECTIONAL VIEW

VI-VI SECTIONAL VIEW

XII–XII SECTIONAL VIEW

XIII-XIII SECTIONAL VIEW

MULTILAYER CERAMIC CAPACITOR

CROSS REFERENCE TO RELATED APPLICATIONS

This application claims the benefit of priority to Japanese Patent Application No. 2020-148588 filed on Sep. 3, 2020. The entire contents of this application are hereby incorporated herein by reference.

BACKGROUND OF THE INVENTION

1. Field of the Invention

The present invention relates to a multilayer ceramic capacitor, and more particularly, to a multilayer ceramic capacitor having a low ESL (Equivalent Series Inductance).

2. Description of the Related Art

A multilayer ceramic capacitor may be used as a decoupling capacitor in a high-frequency circuit, such as a power supply circuit of a large-scale integration (LSI). In this case, in order to stabilize the power supply circuit, the multilayer ceramic capacitor is required to have a lower ESL. Such requirement is increasing along with the trend that electronic devices are being made to support high frequency and high current. The stability of the power supply circuit depends on the ESL of the multilayer ceramic capacitor, and is particularly stable at a lower ESL.

In addition to the decoupling applications, the multilayer ceramic capacitor may be used as an EMI filter (Electromagnetic Interference). In this case, in order to efficiently remove and cancel high frequency noise, it is preferable that the ESL is low.

As illustrated in FIG. 3 of Japanese Patent Laid-Open No. 2008-193055, Japanese Patent Laid-Open No. 2008-193055 discloses that in order to reduce the ESL, the multilayer chip capacitor includes a first outer electrode of a first polarity which surrounds a lower edge of the first side surface and is partially extended onto the bottom surface, a second outer electrode of a first polarity which surrounds a lower edge of the second side surface and is partially extended onto the bottom surface, and a third outer electrode of a second polarity which is formed on the bottom surface and arranged between the first outer electrode and the second outer electrode, the first inner electrode includes a first lead extending to the first side surface and the bottom surface, and a second lead extending to the second side surface and the bottom surface, and the second inner electrode includes a third lead extending to the bottom surface from a position located between the first lead and the second lead.

Japanese Patent Laid-Open No. 2008-193055 discloses that the width of the first lead is the same as the width of the second lead, and the width of the third lead is greater than the width of the first lead and the width of the second lead.

However, as disclosed in Japanese Patent Laid-Open No. 2008-193055, if the width of the third lead is greater than the width of the first lead and the second lead, when an outer electrode corresponding to each of the width of the first lead, the width of the second lead, and the width of the third lead is formed by the DIP method or the like, the width and the thickness of a third outer electrode corresponding to the third lead become greater than the width and the thickness of a first outer electrode corresponding to the first lead and the width and the thickness of a second outer electrode corresponding to the second lead. When such a multilayer ceramic capacitor is mounted on a mounting substrate, a problem arises in that the multilayer ceramic capacitor may be mounted in a tilted state. Since the multilayer ceramic capacitor is mounted in a tilted state, the first outer electrode or the second outer electrode may not be properly connected to a mounting land on the mounting substrate, which causes an open failure. In addition, if the width of the first lead and the width of the second lead are extremely small, the printing limit may be exceeded, and thus, the inner electrode layer may not be printed properly or uniformly in thickness, which causes an improper connection between the inner electrode layer and the outer electrode.

SUMMARY OF THE INVENTION

Preferred embodiments of the present invention provide multilayer ceramic capacitors that are each able to reduce an equivalent series inductance (ESL) thereof and prevent an improper connection between an inner electrode layer and an outer electrode.

A multilayer ceramic capacitor according to a preferred embodiment of the present invention includes a multilayer body including a plurality of dielectric layers that are stacked, the multilayer body including a first main surface and a second main surface opposite to each other in a height direction, a first side surface and a second side surface opposite to each other in a width direction orthogonal or substantially orthogonal to the height direction, and a first end surface and a second end surface opposite to each other in a length direction orthogonal or substantially orthogonal to the height direction and the width direction; a first outer electrode on at least one of the first main surface or the second main surface and positioned closer to the first end surface than to the second end surface; a second outer electrode on at least one of the first main surface or the second main surface and positioned closer to the second end surface than to the first end surface; a third outer electrode on at least one of the first main surface or the second main surface and positioned between the first outer electrode and the second outer electrode; a first inner electrode layer on the plurality of dielectric layers and connected to the first outer electrode and the second outer electrode; and a second inner electrode layer on the plurality of dielectric layers and connected to the third outer electrode. The first inner electrode layer includes a first counter electrode opposed to the second inner electrode layer; a first lead electrode extending from the first counter electrode and connected to the first outer electrode; and a second lead electrode extending from the first counter electrode and connected to the second outer electrode. The second inner electrode layer includes a second counter electrode opposed to the first inner electrode layer; and a third lead electrode extending from the second counter electrode and connected to the third outer electrode. When a length of the first lead electrode and a length of the second lead electrode in the length direction connecting the first end surface and the second end surface are each denoted by a, and a length of the third lead electrode in the length direction connecting the first end surface and the second end surface is denoted by b, b/a is about 0.5 or more and about 0.83 or less.

With the multilayer ceramic capacitor according to the above-described preferred embodiment of the present invention, the wiring distance between the first lead electrode and the third lead electrode and the wiring distance between the second lead electrode and the third lead electrode are shortened, such that the loop inductance is reduced, which makes it possible to reduce the equivalent series inductance (ESL).

Moreover, since the length of the third lead electrode in the length direction connecting the first end surface and the second end surface is smaller than the length of the first lead electrode and the length of the second lead electrode in the length direction connecting the first end surface and the second end surface, it is possible to reduce the thickness of the third outer electrode corresponding to the third lead electrode. As a result, it is possible to prevent the multilayer ceramic capacitor from being mounted in a tilted state, which makes it possible to reliably connect the outer electrode to the mounting land so as to prevent the occurrence of an improper connection (open failure).

According to preferred embodiments of the present invention, it is possible to obtain multilayer ceramic capacitors that are each able to reduce an equivalent series inductance (ESL) thereof and prevent an improper connection from being provided between an inner electrode layer and an outer electrode.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

1. Multilayer Ceramic Capacitor

(1) First Preferred Embodiment

Figure 1:
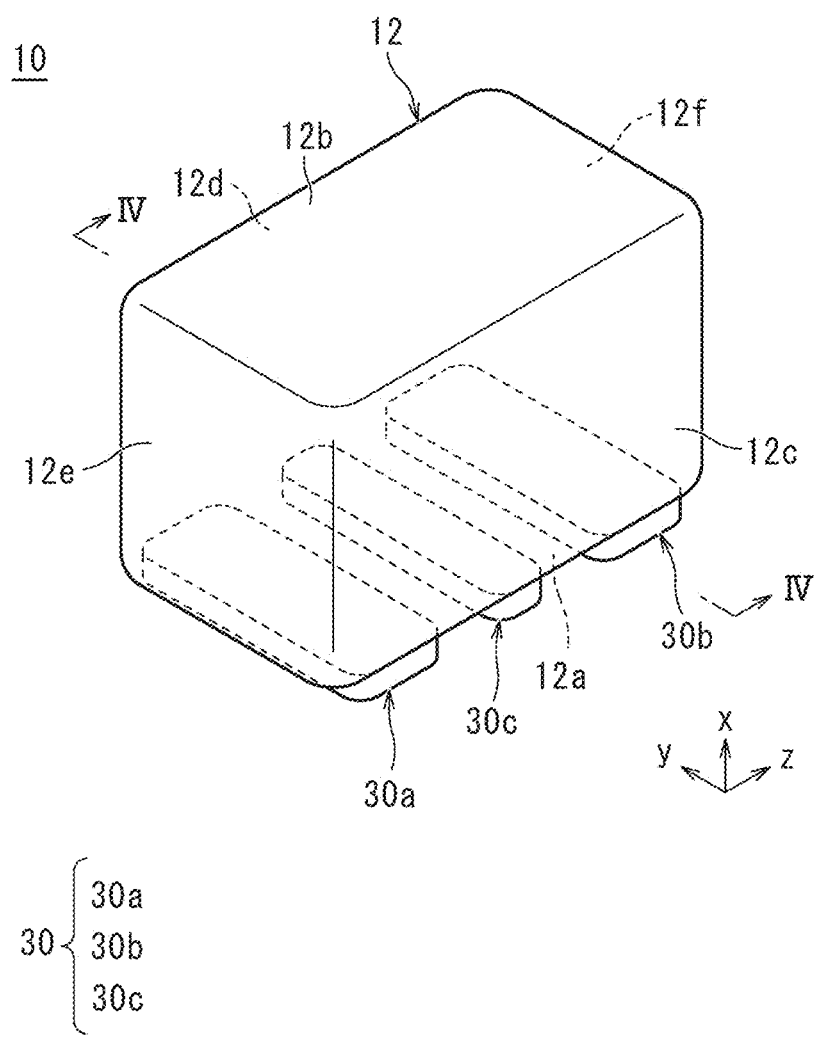
FIG. 1 is an external perspective view illustrating a multilayer ceramic capacitor according to a first preferred embodiment of the present invention.
Figure 2:
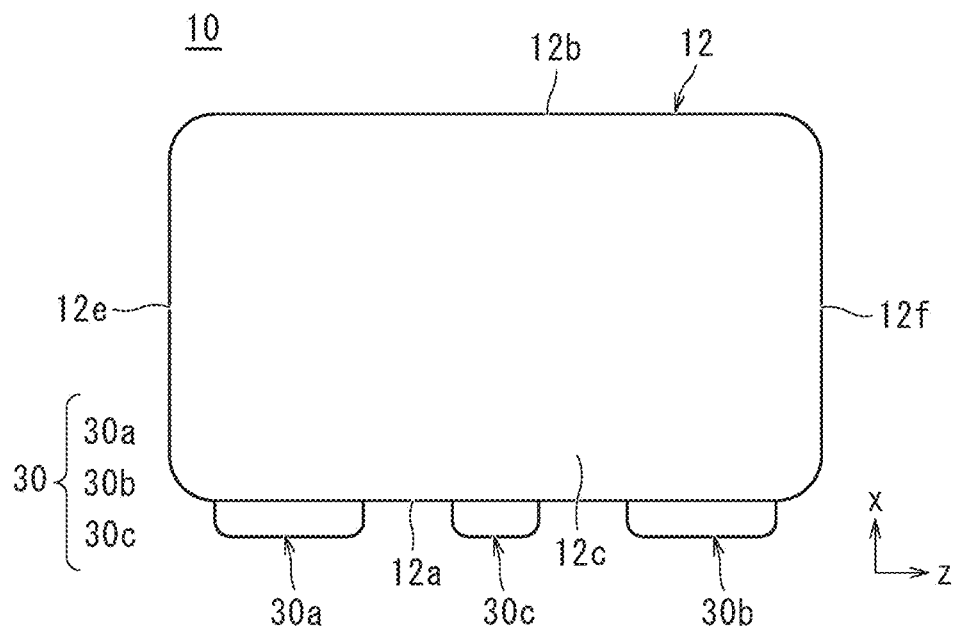
FIG. 2 is a front view of the multilayer ceramic capacitor illustrated in FIG. 1.
Figure 3:
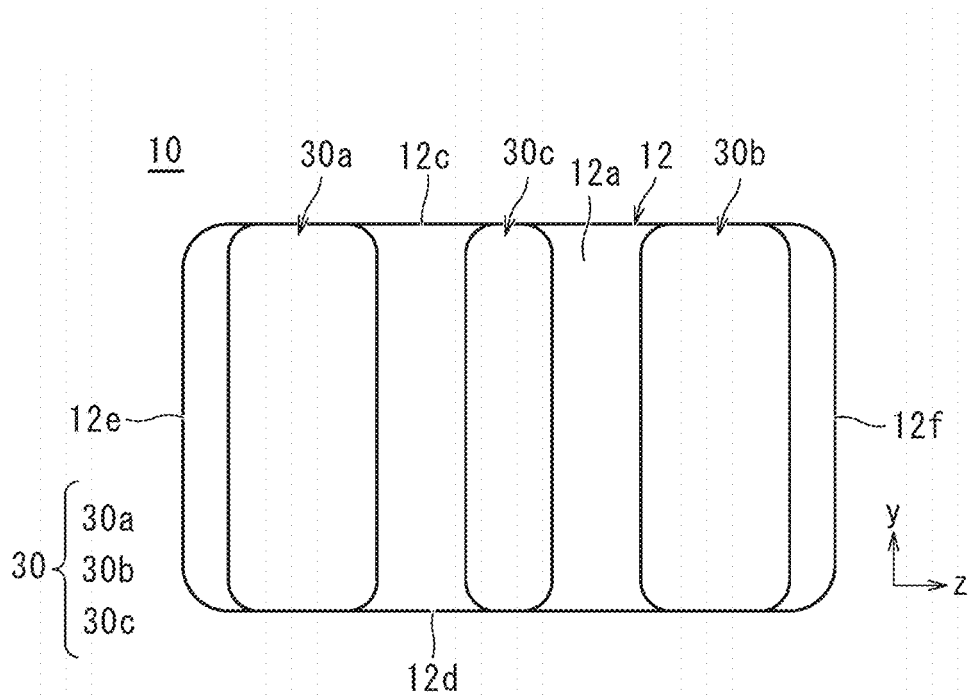
FIG. 3 is a bottom view of the multilayer ceramic capacitor illustrated in FIG. 1.
Figure 4:
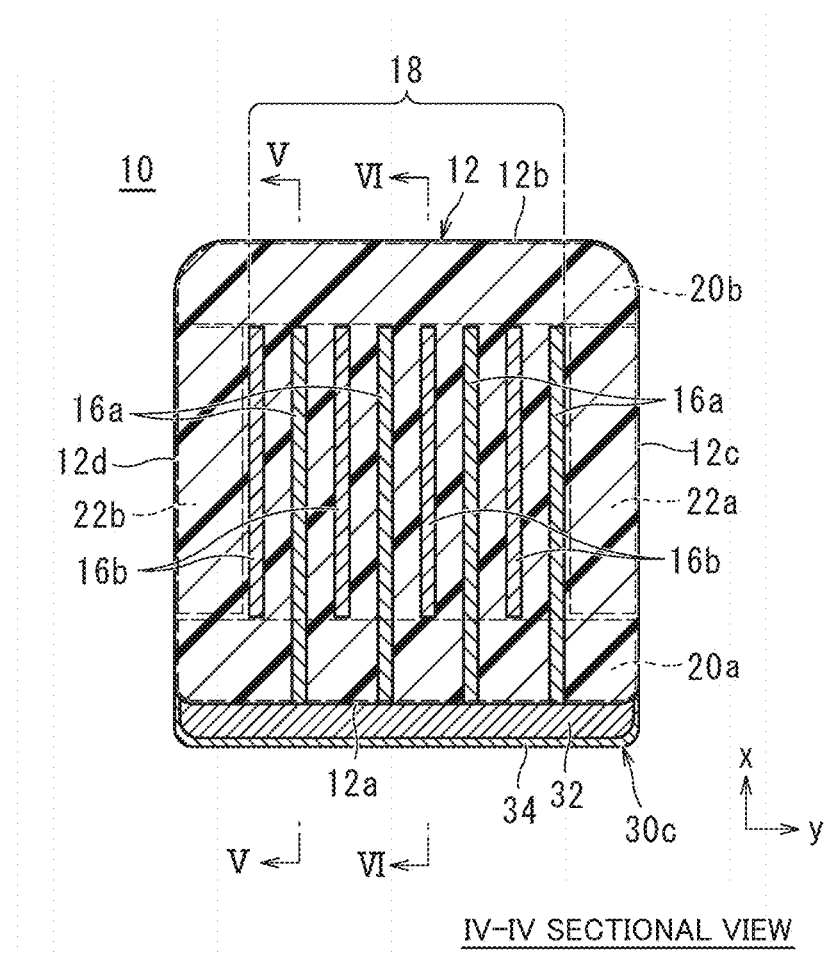
FIG. 4 is a sectional view taken along line IV-IV of the multilayer ceramic capacitor illustrated in FIG. 1.
Figure 5:
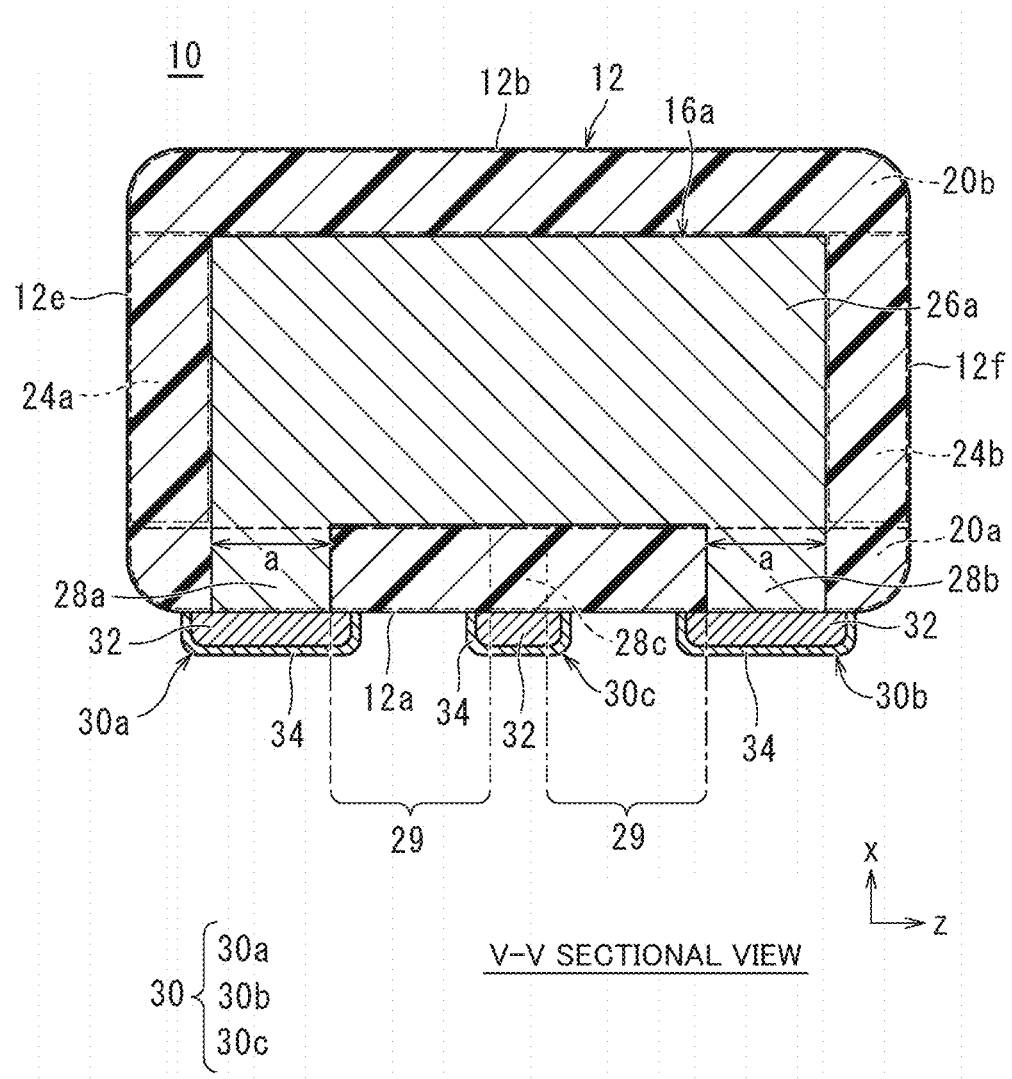
FIG. 5 is a sectional view taken along line V-V of the multilayer ceramic capacitor illustrated in FIG. 4.
Figure 6:
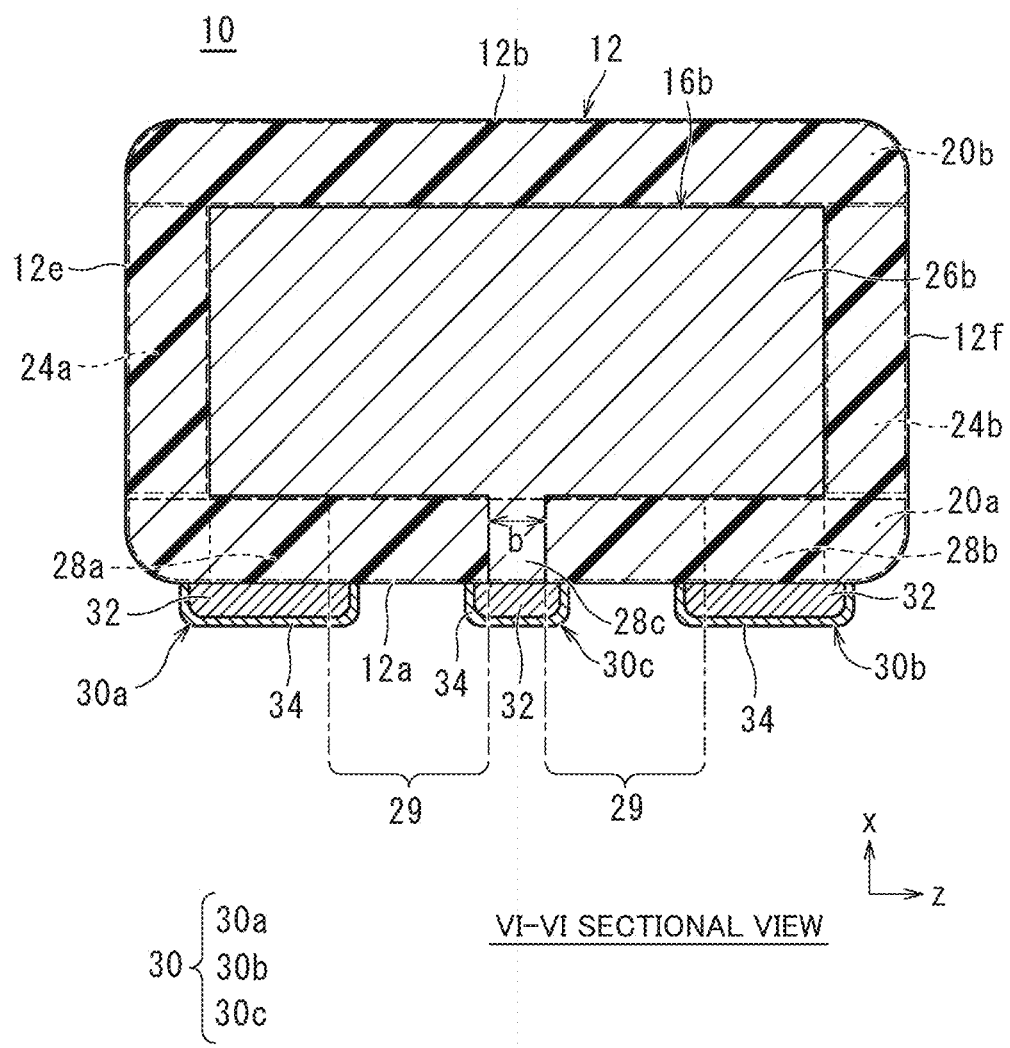
FIG. 6 is a sectional view taken along line VI-VI of the multilayer ceramic capacitor illustrated in FIG. 4.
Figure 7:
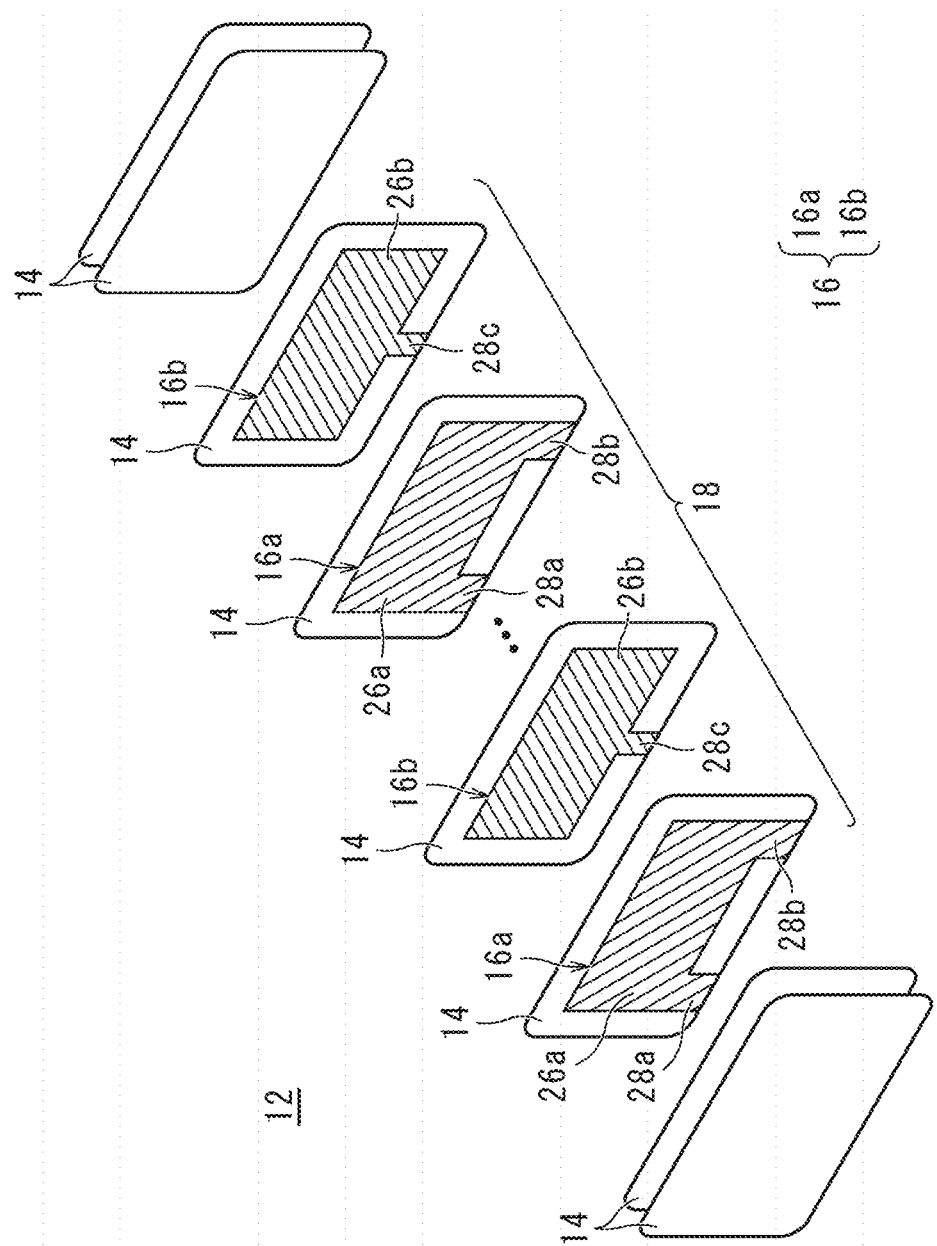
FIG. 7 is an exploded perspective view illustrating a multilayer body of the multilayer ceramic capacitor according to the first preferred embodiment of the present invention.

A multilayer ceramic capacitor 10 according to a first preferred embodiment of the present invention will be described with reference to the drawings. FIG. 1 is an external perspective view illustrating a multilayer ceramic capacitor according to a first preferred embodiment of the present invention. FIG. 2 is a front view of the multilayer ceramic capacitor illustrated in FIG. 1. FIG. 3 is a bottom view of the multilayer ceramic capacitor illustrated in FIG. 1. FIG. 4 is a sectional view taken along line IV-IV of the multilayer ceramic capacitor illustrated in FIG. 1. FIG. 5 is a sectional view taken along line V-V of the multilayer ceramic capacitor illustrated in FIG. 4. FIG. 6 is a sectional view taken along line VI-VI of the multilayer ceramic capacitor illustrated in FIG. 4. FIG. 7 is an exploded perspective view illustrating a multilayer body of the multilayer ceramic capacitor according to the first preferred embodiment of the present invention.

The multilayer ceramic capacitor 10 includes a multilayer body 12 and an outer electrode 30.

Multilayer Body

The multilayer body 12 includes a plurality of dielectric layers 14 stacked respectively with a plurality of inner electrode layers 16. The multilayer body 12 includes a first main surface 12a and a second main surface 12b opposite to each other in a height direction x, a first side surface 12c and a second side surface 12d opposite to each other in a width direction y orthogonal or substantially orthogonal to the height direction x, and a first end surface 12e and a second end surface 12f opposite to each other in a length direction z orthogonal or substantially orthogonal to the height direction x and the width direction y.

The multilayer body 12 includes rounded corners and ridges. The corner is a portion where three adjacent surfaces of the multilayer body 12 intersect, and the ridge is a portion where two adjacent surfaces of the multilayer body 12 intersect. A portion of or the entire first main surface 12a and second main surface 12b, a portion of or the entire first side surface 12c and second side surface 12d, and a portion of or the entire first end surface 12e and second end surface 12f may be uneven.

The number of the dielectric layers 14 is preferably 15 or more and 700 or less, for example.

The dielectric layer 14 may be made of, for example, a dielectric ceramic containing a main component such as $BaTiO_3$, $CaTiO_3$, $SrTiO_3$, or $CaZnO_3$. In addition to the main component, the dielectric ceramic may include a subcomponent such as, for example, an Mn compound, an Fe compound, a Cr compound, a Co compound, or a Ni compound.

The thickness of the dielectric layer 14 is preferably about 0.4 μm or more and about 10 μm or less, for example.

In the multilayer body 12, a plurality of inner electrode layers 16 are stacked with a dielectric layer 14 interposed therebetween in the width direction y connecting the first side surface 12c and the second side surface 12d. In other words, the plurality of inner electrode layers 16 are opposite to each other in the width direction y connecting the first side surface 12c and the second side surface 12d, and perpendicular or substantially perpendicular to the second main surface 12b which defines and functions as a mounting surface.

The multilayer body 12 includes an inner layer portion 18 in which the plurality of inner electrode layers 16 are opposite to each other.

The multilayer body 12 includes a first main-surface outer layer portion 20a on the first main surface 12a and including a plurality of dielectric layers 14 between the first main surface 12a and the outermost surface of the inner layer portion 18 closer to the first main surface 12a and between the first main surface 12a and an extension line of the outermost surface of the inner layer portion 18, and a second main-surface outer layer portion 20b on the second main surface 12b and including a plurality of dielectric layers 14 between the second main surface 12b and the outermost surface of the inner layer portion 18 closer to the second main surface 12b and between the second main surface 12b and an extension line of the outermost surface of the inner layer portion 18.

The multilayer body 12 includes a first side-surface outer layer portion 22a on the first side surface 12c and including a plurality of dielectric layers 14 between the first side surface 12c and the outermost surface of the inner layer portion 18 closer to the first side surface 12c, and a second side-surface outer layer portion 22b on the second side surface 12d and including a plurality of dielectric layers 14 between the second side surface 12d and the outermost surface of the inner layer portion 18 closer to the second side surface 12d.

FIG. 4 illustrates a width of the first side-surface outer layer portion 22a and a width of the second side-surface outer layer portion 22b in the width direction y. The width of the first side-surface outer layer portion 22a and the width of the second side-surface outer layer portion 22b in the width direction y is also referred to as a W gap or a side gap.

The multilayer body 12 includes a first end-surface outer layer portion 24a on the first end surface 12e and including a plurality of dielectric layers 14 between the first end surface 12e and the outermost surface of the inner layer portion 18 closer to the first end surface 12e, and a second end-surface outer layer portion 24b on the second end surface 12f and including a plurality of dielectric layers 14 between the second end surface 12f and the outermost surface of the inner layer portion 18 closer to the second end surface 12f.

FIG. 5 illustrates a width of the first end-surface outer layer portion 24a and a width of the second end-surface outer layer portion 24b in the length direction z. The width of the first end-surface outer layer portion 24a and the width of the second end-surface outer layer portion 24b in the length direction z is also referred to as an L gap or an end gap.

The dimensions of the multilayer body 12 are not particularly limited, but, for example, the dimension L is preferably about 0.2 mm or more and about 10 mm or less, the dimension W is preferably about 0.1 mm or more and about 10 mm or less, and the dimension T is preferably about 0.1 mm or more and about 5 mm or less.

Outer Electrode

The outer electrode 30 includes a first outer electrode 30a, a second outer electrode 30b, and a third outer electrode 30c.

The first outer electrode 30a is on at least one of the first main surface 12a or the second main surface 12b, and is closer to the first end surface 12e than to the second end surface 12f. The first outer electrode 30a is connected to a first lead electrode 28a of a first inner electrode layer 16a, which will be described later.

The first outer electrode 30a is on the first main surface 12a or the second main surface 12b, and extends in the width direction y connecting the first side surface 12c and the second side surface 12d and in the length direction z connecting the first end surface 12e and the second end surface 12f. The first outer electrode 30a has a length equal or substantially equal to the length of the multilayer body 12 in the width direction y connecting the first side surface 12c and the second side surface 12d.

The length of the first outer electrode 30a in the width direction y connecting the first side surface 12c and the second side surface 12d is not particularly limited.

It is preferable that the length of the first outer electrode 30a in the length direction z connecting the first end surface 12e and the second end surface 12f is equal or substantially equal to the length of the first lead electrode 28a of the first inner electrode layer 16a in the length direction z connecting the first end surface 12e and the second end surface 12f. More specifically, the length of the first outer electrode 30a in the length direction z connecting the first end surface 12e and the second end surface 12f is equal or substantially equal to the sum of the length of the first lead electrode 28a of the first inner electrode layer 16a in the length direction z connecting the first end surface 12e and the second end surface 12f and the thickness of the first outer electrode 30a. Therefore, the length of the first outer electrode 30a in the length direction z connecting the first end surface 12e and the second end surface 12f is greater than the length of the third outer electrode 30c in the length direction z connecting the first end surface 12e and the second end surface 12f, which will be described later.

The second outer electrode 30b is on at least one of the first main surface 12a or the second main surface 12b, and is closer to the second end surface 12f than to the first end surface 12e. The second outer electrode 30b is connected to a second lead electrode 28b of the first inner electrode layer 16a, which will be described later.

The second outer electrode 30b is on the first main surface 12a or the second main surface 12b, and extends in the width direction y connecting the first side surface 12c and the second side surface 12d and in the length direction z connecting the first end surface 12e and the second end surface 12f. The second outer electrode 30b has a length equal or substantially equal to the length of the multilayer body 12 in the width direction y connecting the first side surface 12c and the second side surface 12d.

The length of the second outer electrode 30b in the width direction y connecting the first side surface 12c and the second side surface 12d is not particularly limited.

It is preferable that the length of the second outer electrode 30b in the length direction z connecting the first end surface 12e and the second end surface 12f is equal or substantially equal to the length of the second lead electrode 28b of the first inner electrode layer 16a in the length direction z connecting the first end surface 12e and the second end surface 12f. More specifically, the length of the second outer electrode 30b in the length direction z connecting the first end surface 12e and the second end surface 12f is equal or substantially equal to the sum of the length of the second lead electrode 28b of the first inner electrode layer 16a in the length direction z connecting the first end surface 12e and the second end surface 12f and the thickness of the second outer electrode 30b. Therefore, the length of the second outer electrode 30b in the length direction z connecting the first end surface 12e and the second end surface 12f is greater than the length of the third outer electrode 30c in the length direction z connecting the first end surface 12e and the second end surface 12f, which will be described later.

The third outer electrode 30c is on at least one of the first main surface 12a or the second main surface 12b, and is between the first outer electrode 30a and the second outer electrode 30b. The third outer electrode 30c is connected to a third lead electrode 28c of a second inner electrode layer 16b, which will be described later.

The third outer electrode 30c is on the first main surface 12a or the second main surface 12b, and extends in the width direction y connecting the first side surface 12c and the second side surface 12d and in the length direction z connecting the first end surface 12e and the second end surface 12f. The third outer electrode 30c has a length equal or substantially equal to the length of the multilayer body 12 in the width direction y connecting the first side surface 12c and the second side surface 12d.

The length of the third outer electrode 30c in the width direction y connecting the first side surface 12c and the second side surface 12d is not particularly limited.

It is preferable that the length of the third outer electrode 30c in the length direction z connecting the first end surface 12e and the second end surface 12f is equal or substantially equal to the length of the third lead electrode 28c of the second inner electrode layer 16b in the length direction z connecting the first end surface 12e and the second end surface 12f. More specifically, the length of the third outer electrode 30c in the length direction z connecting the first end surface 12e and the second end surface 12f is equal or substantially equal to the sum of the length of the third lead electrode 28c of the second inner electrode layer 16b in the length direction z connecting the first end surface 12e and the second end surface 12f and the thickness of the third outer electrode 30c. Therefore, the length of the third outer electrode 30c in the length direction z connecting the first end surface 12e and the second end surface 12f is shorter than the length of the first outer electrode 30a in the length direction z connecting the first end surface 12e and the second end surface 12f and the length of the second outer electrode 30b in the length direction z connecting the first end surface 12e and the second end surface 12f.

Hereinafter, a multilayer ceramic capacitor according to a modification of the first preferred embodiment will be described.

Figure 8:
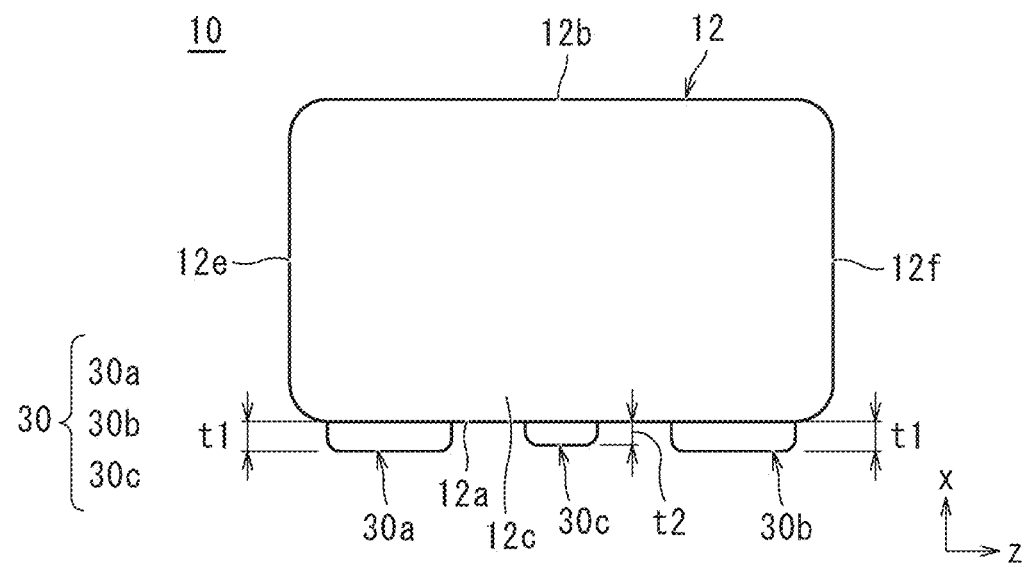
FIG. 8 is a front view illustrating a multilayer ceramic capacitor according to a modification of the first preferred embodiment of the present invention.

FIG. 8 is a front view illustrating a multilayer ceramic capacitor according to a modification of the first preferred embodiment of the present invention.

In the modification to be described hereinafter, the components corresponding to those in the first preferred embodiment are denoted by the same reference numerals, and the detailed description thereof will not be repeated.

FIGS. 1 to 6 illustrate a case in which the thickness of the first outer electrode 30a in the height direction x connecting the first main surface 12a and the second main surface 12b and the thickness of the second outer electrode 30b in the height direction x connecting the first main surface 12a and the second main surface 12b are each denoted by t1, and the thickness of the third outer electrode 30c in the height direction x connecting the first main surface 12a and the second main surface 12b is denoted by t2, then t1=t2. However as illustrated in FIG. 8, it is preferable that t1>t2. Thus, when the multilayer ceramic capacitor 10 is mounted on a substrate using the first main surface 12a as a mounting surface, the third outer electrode 30c is prevented from becoming a fulcrum, which makes it possible to prevent the multilayer ceramic capacitor 10 from being mounted in a tilted state or to prevent the third outer electrode 30c from being improperly connected to the mounting land on the mounting substrate, and thus it is possible to avoid an improper connection (open failure) and obtain a high mounting stability.

A multilayer ceramic capacitor according to another modification of the first preferred embodiment will be described.

Figure 9:
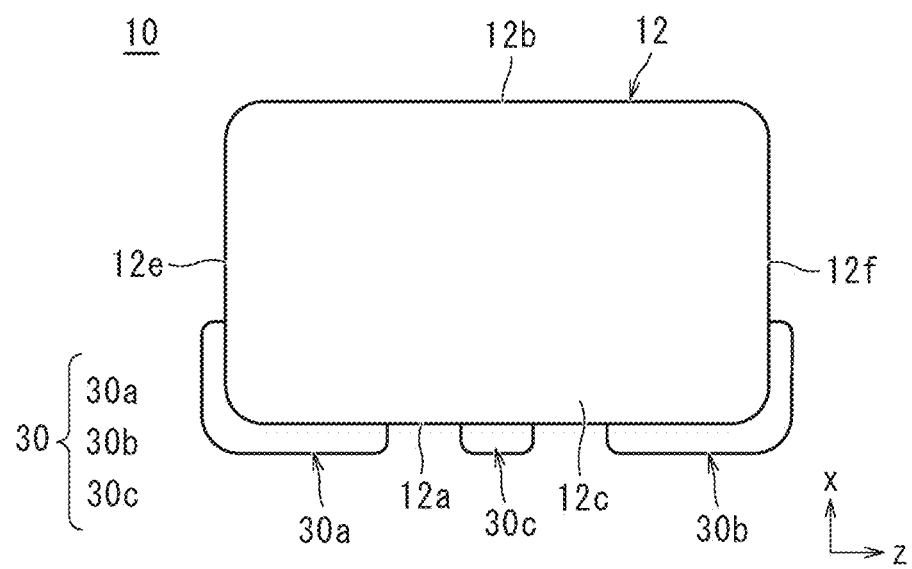
FIG. 9 is a front view illustrating a multilayer ceramic capacitor according to another modification of the first preferred embodiment of the present invention.

FIG. 9 is a front view illustrating a multilayer ceramic capacitor according to another modification of the first preferred embodiment of the present invention.

The first outer electrode 30a may extend from the first main surface 12a or the second main surface 12b onto the first end surface 12e. As a result, the solder may wet up to a portion of the end surface during mounting, which makes the mounting posture more stable.

The second outer electrode 30b may extend from the first main surface 12a or the second main surface 12b onto the second end surface 12f. As a result, the solder may wet up to a portion of the end surface during mounting, which makes the mounting posture more stable.

It is preferable that each of the first outer electrode 30a, the second outer electrode 30b, and the third outer electrode 30c includes a base electrode layer 32 and a plating layer 34 in order from the side of the multilayer body 12.

In other words, the outer electrode 30 includes a base electrode layer 32 including a metal component and a glass component, and a plating layer 34 on the surface of the base electrode layer 32.

The base electrode layer 32 includes at least one selected from a baked layer, a conductive resin layer or the like, for example. In the present preferred embodiment, the base electrode layer 32 includes the baked layer only. However, the description will also be provided on the case where the base electrode layer 32 includes the conductive resin layer.

Baked Layer

The baked layer includes a glass component and a metal component. The glass component of the baked layer includes, for example, at least one selected from B, Si, Ba, Mg, Al, Li, or the like. The metal component of the baked layer includes, for example, at least one selected from Cu, Ni, Ag, Pd, Ag—Pd alloy, Au, or the like. The baked layer may include a plurality of layers.

The baked layer is formed by coating a conductive paste including a glass component and a metal component on the multilayer body 12 and baking the same. The baked layer may be obtained by simultaneously firing a multilayer chip including the inner electrode layer 16 and the dielectric layer 14 and a conductive paste coated on the multilayer chip, or may be obtained by firing a multilayer chip including the inner electrode layer 16 and the dielectric layer 14 to obtain the multilayer body 12, and then coating the conductive paste on the multilayer body 12 and baking the same. If the baked layer is formed by simultaneously firing a multilayer chip including the inner electrode layer 16 and the dielectric layer 14 and a conductive paste coated on the multilayer chip, it is preferable that the conductive paste includes a dielectric component, instead of the glass component.

The thickness in the height direction x connecting the first main surface 12a and the second main surface 12b of a central portion of the baked layer located on the first main surface 12a or the second main surface 12b in the width direction y connecting the first side surface 12c and the second side surface 12d is preferably, for example, about 5 μm or more and about 150 μm or less.

Further, as illustrated in FIG. 9, when the base electrode layer 32 (baked layer) provided on a portion of the first end surface 12e and a portion of the second end surface 12f, the thickness in the length direction z connecting the first end surface 12e and the second end surface 12f of a central portion of the baked layer located on the first side surface 12c and the second side surface 12d in the height direction x connecting the first main surface 12a and the second main surface 12b is preferably, for example, about 5 μm or more and about 150 μm or less.

Conductive Resin Layer

The conductive resin layer may include a plurality of layers. The conductive resin layer may be provided on the baked layer so as to cover the baked layer, or may be provided directly on the multilayer body 12.

The conductive resin layer includes a thermosetting resin and a metal. Since the conductive resin layer includes a thermosetting resin, the conductive resin layer is more flexible than a conductive layer made of, for example, a plating film or a fired product of a conductive paste. Therefore, even when a physical impact or an impact due to thermal cycle is applied to the multilayer ceramic capacitor 10, the conductive resin layer may define and function as a buffer layer to prevent cracks from occurring in the multilayer ceramic capacitor 10, i.e., a ceramic electronic component.

The metal included in the conductive resin layer may be, for example, Ag, Cu, Ni, Sn, Bi, or an alloy thereof. Alternatively, the metal included in the conductive resin layer may be, for example, a metal powder coated with Ag on the surface thereof. In this case, the metal powder is preferably Cu, Ni, Sn, Bi or an alloy thereof, for example.

The reason why a conductive metal powder of Ag is preferably used as the conductive metal is that Ag has the lowest specific resistance among metals and thus is suitable as an electrode material, and Ag is a noble metal which does not oxidize and thus has good weather resistance. Moreover, the use of a conductive metal powder of Ag as the conductive metal may make the metal of the base material inexpensive while maintaining the characteristics of Ag.

Further, the metal included in the conductive resin layer may be obtained, for example, by subjecting Cu or Ni to oxidation prevention treatment.

The metal included in the conductive resin layer may be, for example, a metal powder coated with Sn, Ni, or Cu on the surface thereof. In this case, the metal powder is preferably Ag, Cu, Ni, Sn, Bi, or an alloy thereof, for example.

The metal included in the conductive resin layer is preferably, for example, about 35% or more by volume and about 75% or less by volume with respect to the total volume of the conductive resin.

The average particle size of the metal included in the conductive resin layer is not particularly limited. The average particle size of the conductive filler may be, for example, about 0.3 μm or more and about 10 μm or less.

The metal included in the conductive resin layer is mainly responsible for electric conduction in the conductive resin layer. Specifically, the conductive fillers are brought into contact with each other to provide an electric conduction path inside the conductive resin layer. The shape of the metal included in the conductive resin layer is not particularly limited. The metal included in the conductive resin layer may be a spherical metal powder, a flat metal powder, or the like, but it is preferably a mixture of a spherical metal powder and a flat metal powder.

The resin included in the conductive resin layer may be, for example, various known thermosetting resins such as epoxy resin, phenoxy resin, phenol resin, urethane resin, silicone resin, and polyimide resin. Among them, epoxy resin has excellent heat resistance, moisture resistance, adhesion and the like and is preferably.

The resin included in the conductive resin layer is preferably, for example, about 25% or more by volume and about 65% or less by volume with respect to the total volume of the conductive resin.

It is preferable that the conductive resin layer includes a curing agent in addition to the thermosetting resin. When the base resin is epoxy resin, the curing agent for the epoxy resin may be, for example, various known compounds such as phenol compounds, amine compounds, acid anhydride compounds, imidazole compounds, active ester compounds, and amide imide compounds.

It is preferable that the thickness in the height direction x connecting the first main surface 12a and the second main surface 12b of a central portion of the conductive resin layer located on the first main surface 12a or the second main surface 12b in the width direction y connecting the first side surface 12c and the second side surface 12d is, for example, about 5 μm or more and about 150 μm or less.

When a conductive resin layer is provided on a portion of the first end surface 12e and a portion of the second end surface 12f, the thickness in the length direction z connecting the first end surface 12e and the second end surface 12f of a central portion of the conductive resin layer located on the first side surface 12c and the second side surface 12d in the height direction x connecting the first main surface 12a and the second main surface 12b is preferably, for example, about 5 μm or more and about 150 μm or less.

Plating Layer

The plating layer 34 covers the base electrode layer 32.

The plating layer 34 may include, for example, at least one selected from Cu, Ni, Sn, Pd, Ag—Pd alloy, Au, or the like.

The plating layer 34 may include a plurality of layers. It is preferable that the plating layer has a two-layer structure including a first plating layer on the surface of the baked layer and a second plating layer on the surface of the first plating layer.

The plating layer preferably has a two-layer structure including, for example, an Ni plating layer and an Sn plating layer in this order. The Ni plating layer prevents the base electrode layer 32 from being eroded by solder when mounting the multilayer ceramic capacitor 10, and the Sn plating layer improves the wettability of solder when mounting the multilayer ceramic capacitor 10, which makes the mounting easier. The thickness of each plating layer 34 is preferably about 1 μm or more and about 15 μm or less, for example.

When the inner electrode layer 16 includes Ni, it is preferable that the first plating layer includes Cu having a good bonding property to Ni.

The outer electrode 30 may include only a plating layer without the base electrode layer 32.

Hereinafter, a structure including only a plating layer without the base electrode layer 32 will be described.

Each of the first outer electrode 30a, the second outer electrode 30b, and the third outer electrode 30c may be a plating layer provided directly on the surface of the multilayer body 12 without the base electrode layer 32. In other words, the multilayer ceramic capacitor 10 may have a structure that includes a plating layer electrically connected to the first inner electrode layer 16a or the second inner electrode layer 16b. In this case, the plating layer may be formed after a pretreatment in which a catalyst is disposed on the surface of the multilayer body 12.

It is preferable that the plating layer includes a lower plating electrode on the surface of the multilayer body 12 and an upper plating electrode on the surface of the lower plating electrode. It is preferable that each of the lower plating electrode and the upper plating electrode includes at least one metal selected from, for example, Cu, Ni, Sn, Pb, Au, Ag, Pd, Bi, or Zn, or an alloy containing the metal.

Further, the lower plating electrode is preferably made of Ni having solder barrier performance, and the upper plating electrode is preferably made of Sn or Au having good solder wettability.

For example, when the first inner electrode layer 16a and the second inner electrode layer 16b are made of Ni, the lower plating electrode is preferably made of Cu having good bonding property to Ni. The upper plating electrode may be provided as necessary, and each of the first outer electrode 30a, the second outer electrode 30b, and the third outer electrode 30c may include only the lower plating electrode.

In the plating layer, the upper plating electrode may be the outermost layer, or another plating electrode may be further provided on the surface of the upper plating electrode.

In the case where the plating layer is directly provided on the multilayer body 12 without the base electrode layer 32, due to the reduction of the thickness of the base electrode layer 32, the thickness of the element body, i.e., the thicknesses of the effective layer portions such as a first counter electrode 26a and a second counter electrode 26b is reduced or thinned, which makes it possible to improve the degree of freedom in designing thin chips. The thickness of each plating layer provided without the base electrode layer 32 is preferably about 1 μm or more and about 15 μm or less, for example.

Further, it is preferable that the plating layer does not include glass. The metal content per unit volume of the plating layer is preferably 99% or more by volume.

Inner Electrode Layer

The inner electrode layer 16 includes a plurality of first inner electrode layers 16a and a plurality of second inner electrode layers 16b.

The first inner electrode layers 16a are provided on the plurality of dielectric layers 14, and connected to the first outer electrode 30a and the second outer electrode 30b.

The second inner electrode layers 16b are provided on the plurality of dielectric layers 14, and connected to the third outer electrode 30c.

The first inner electrode layer 16a includes a first counter electrode 26a opposed to the second inner electrode layer 16b, a first lead electrode 28a extending from the first counter electrode 26a so as to be connected to the first outer electrode 30a, and a second lead electrode 28b extending from the first counter electrode 26a so as to be connected to the second outer electrode 30b.

The shape of the first counter electrode 26a of the first inner electrode layer 16a is not particularly limited, but is preferably rectangular or substantially rectangular. It is more preferable that the corner is rounded or inclined (tapered).

The first lead electrode 28a and the second lead electrode 28b extend to the surface of the first main surface 12a or the surface of the second main surface 12b. The shape of the first lead electrode 28a and the shape of the second lead electrode 28b of the first inner electrode layer 16a are not particularly limited, but are preferably rectangular or substantially rectangular. It is more preferable that the corner is rounded or inclined (tapered). Alternatively, the corner may be tapered toward either side.

The second inner electrode layer 16b includes a second counter electrode 26b opposed to the first inner electrode layer 16a, and a third lead electrode 28c extending from the second counter electrode 26b so as to be connected to the third outer electrode 30c.

The shape of the second counter electrode 26b of the second inner electrode layer 16b is not particularly limited, but is preferably rectangular or substantially rectangular. It is more preferable that the corner is rounded or inclined (tapered). Alternatively, the corner may be tapered toward either side.

The third lead electrode 28c extends to the surface of the first main surface 12a or the surface of the second main surface 12b. The shape of the third lead electrode 28c of the second inner electrode layer 16b is not particularly limited, but is preferably rectangular or substantially rectangular. It is more preferable that the corner is rounded or inclined (tapered). Alternatively, the corner may be tapered toward either side.

Thus, in the present preferred embodiment, the distance between the third lead electrode 28c and the first lead electrode 28a or the second lead electrode 28b is defined as a gap 29 between the inner electrode layers.

When the length of the first lead electrode 28a and the length of the second lead electrode 28b in the length direction z connecting the first end surface 12e and the second end surface 12f are each denoted by a, and the length of the third lead electrode 28c in the length direction z connecting the first end surface 12e and the second end surface 12f is denoted by b, b/a is about 0.5 or more and about 0.83 or less, for example. Thus, the wiring distance between the first lead electrode 28a and the third lead electrode 28c and the wiring distance between the second lead electrode 28b and the third lead electrode 28c are shortened, such that the loop inductance is reduced, which makes it possible to reduce the equivalent series inductance (ESL). Moreover, since the length of the third lead electrode 28c in the length direction z connecting the first end surface 12e and the second end surface 12f is smaller than the length of the first lead electrode 28a and the length of the second lead electrode 28b in the length direction z connecting the first end surface 12e and the second end surface 12f, the thickness of the third outer electrode 30c corresponding to the third lead electrode 28c may be reduced. As a result, it is possible to prevent the multilayer ceramic capacitor 10 from being mounted in a tilted state, which makes it possible to reliably connect the outer electrode 30 to the mounting land so as to prevent the occurrence of an improper connection (open failure). Furthermore, by setting the parameters within the numerical range of preferred embodiments of the present invention, it is possible to for the inner electrode layer 16 to be printed properly or uniformly in thickness, which makes it possible to prevent an improper connection from being provided between the outer electrode 30 and the lead electrode of the inner electrode layer 16. As a result, it is possible to prevent the capacitance of the multilayer ceramic capacitor 10 from becoming insufficient.

If b/a is smaller than about 0.5, the length of the first lead electrode 28a and the length of the second lead electrode 28b become greater, and it is impossible to sufficiently provide the distance between the first lead electrode 28a and the third lead electrode 28c and the distance between the second lead electrode 28b and the third lead electrode 28c, in other words, the gap 29 between the inner electrode layers is reduced, and thus a short circuit may occur between the outer electrodes 30. If b/a is greater than about 0.83, when the outer electrode 30 is formed by the DIP method or the plating method, the thickness of the third outer electrode 30c may become greater than the thickness of the first outer electrode 30a and the thickness of the second outer electrode 30b, and the third outer electrode 30c may define and function as a fulcrum, such that the multilayer ceramic capacitor 10 may be mounted in a tilted state, or the third outer electrode 30c may be improperly connected to the mounting land on the mounted substrate, which causes an improper connection (open failure) to occur. If b/a is further greater than about 3, the length of the first lead electrode 28a and the length of the second lead electrode 28b become excessively small, and the printing of the inner electrode layer 16 may become worse, such that the first lead electrode 28a or the second lead electrode 28b may be improperly connected to the outer electrode 30, and the capacitance of the multilayer ceramic capacitor 10 may become insufficient.

The length a of the first lead electrode 28a and the length a of the second lead electrode 28b in the length direction z connecting the first end surface 12e and the second end surface 12f, and the length b of the third lead electrode 28c in the length direction z connecting the first end surface 12e and the second end surface 12f may be measured by the following method.

Specifically, the cross section of the multilayer ceramic capacitor 10 is polished along the side surface to a position of ½ W to expose an LT surface. At this time, a surface to expose the first inner electrode layer 16a and a surface to expose the second inner electrode layer 16b are obtained, and the dimension a and the dimension b may be measured using an optical microscope. In the case where each of the first lead electrode 28a, the second lead electrode 28b and the third lead electrode 28c has a tapered shape, the lengths of the first lead electrode 28a, the second lead electrode 28b and the third lead electrode 28c on the outermost surface of the first main surface 12a or the second main surface 12b are measured.

The first inner electrode layer 16a and the second inner electrode layer 16b may be made of an appropriate conductive material, for example, a metal such as Ni, Cu, Ag, Pd or Au, or an alloy including at least one of these metals such as an Ag—Pd alloy.

The capacitance is generated by the adjacent inner electrode layers 16 opposite to each other with the dielectric layer 14 interposed therebetween, and thus the multilayer ceramic capacitor 10 exhibits the characteristics of a capacitor. The thickness of each of the first inner electrode layer 16a and the second inner electrode layer 16b is preferably, for example, about 0.2 μm or more and about 2.0 μm or less. The total number of the first inner electrode layers 16a and the second inner electrode layers 16b is preferably 15 or more and 700 or less, for example.

Multilayer Ceramic Capacitor

In the present preferred embodiment, the dimension of the multilayer ceramic capacitor 10 (which includes the multilayer body 12 and the outer electrode 30) in the length direction z is denoted by dimension L. The dimension L is preferably about 0.2 mm or more and about 10 mm or less, for example.

In the present preferred embodiment, the dimension of the multilayer ceramic capacitor 10 (which includes the multilayer body 12 and the outer electrode 30) in the height direction x is denoted by dimension T. The T dimension is preferably about 0.1 mm or more and about 10 mm or less, for example.

In the present preferred embodiment, the dimension of the multilayer ceramic capacitor 10 (which includes the multilayer body 12 and the outer electrode 30) in the width direction y is denoted by dimension W. The dimension W is preferably about 0.1 mm or more and about 5 mm or less, for example.

In the multilayer ceramic capacitor 10 illustrated in FIG. 1, when the length of the first lead electrode 28a and the length of the second lead electrode 28b in the length direction z connecting the first end surface 12e and the second end surface 12f are each denoted by a, and the length of the third lead electrode 28c in the length direction z connecting the first end surface 12e and the second end surface 12f is denoted by b, b/a is preferably about 0.5 or more and about 0.83 or less, for example. Thus, the wiring distance between the first lead electrode 28a and the third lead electrode 28c and the wiring distance between the second lead electrode 28b and the third lead electrode 28c are shortened, such that the loop inductance is reduced, which makes it possible to reduce the equivalent series inductance (ESL).

Further, in the multilayer ceramic capacitor 10 illustrated in FIG. 1, since the length of the third lead electrode 28c in the length direction z connecting the first end surface 12e and the second end surface 12f is smaller than the length of the first lead electrode 28a and the second lead electrode 28b in the length direction z connecting the first end surface 12e and the second end surface 12f, the thickness of the third outer electrode 30c corresponding to the third lead electrode 28c may be reduced. As a result, it is possible to prevent the multilayer ceramic capacitor 10 from being mounted in a tilted state, which makes it possible to reliably connect the outer electrode 30 to the mounting land so as to prevent the occurrence of an improper connection (open failure).

Further, in the multilayer ceramic capacitor 10 illustrated in FIG. 1, when the length of the first lead electrode 28a and the length of the second lead electrode 28b in the length direction z connecting the first end surface 12e and the second end surface 12f are each denoted by a, and the length of the third lead electrode 28c in the length direction z connecting the first end surface 12e and the second end surface 12f is denoted by b, b/a is preferably about 0.5 or more and about 0.83 or less, for example, it is possible for the inner electrode layer 16 to be printed properly or uniformly in thickness, which makes it possible to prevent an improper connection from being provided between the outer electrode 30 and the lead electrode of the inner electrode layer 16. As a result, it is possible to prevent the capacitance of the multilayer ceramic capacitor 10 from becoming insufficient.

(2) Second Preferred Embodiment

Hereinafter, a multilayer ceramic capacitor 110 according to a second preferred embodiment of the present invention will be described.

Figure 10:
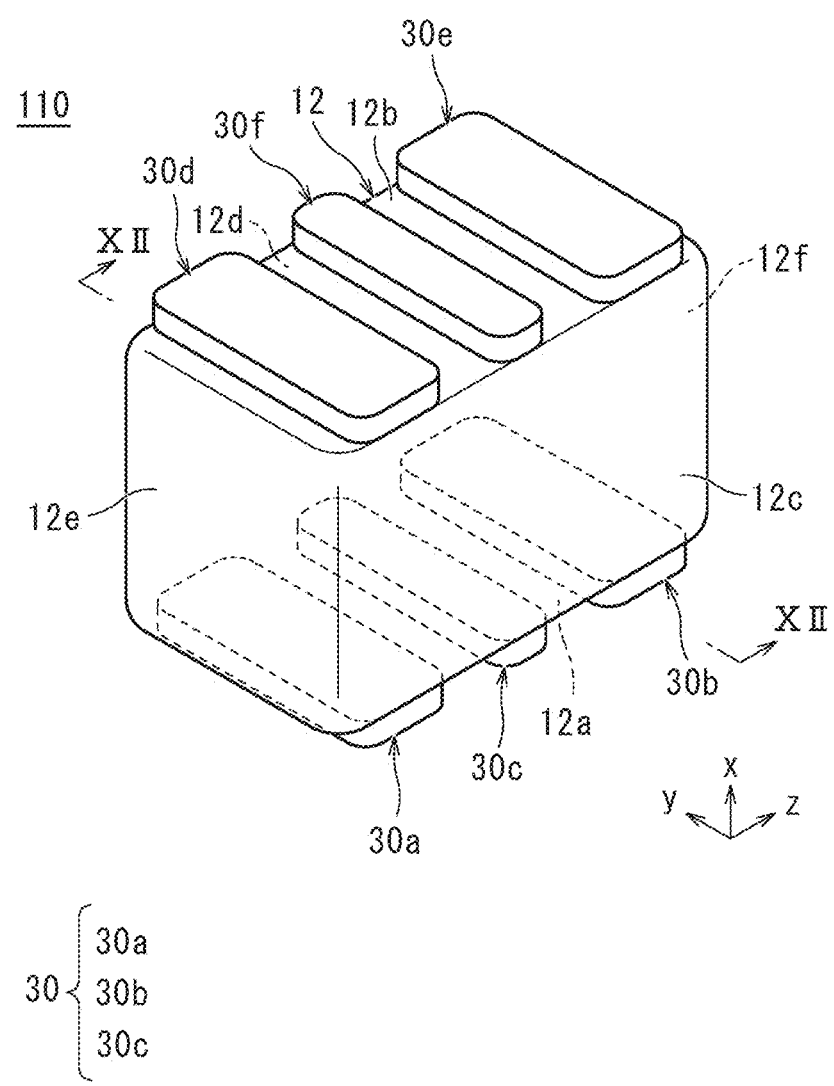
FIG. 10 is an external perspective view illustrating a multilayer ceramic capacitor according to a second preferred embodiment of the present invention.
Figure 11:
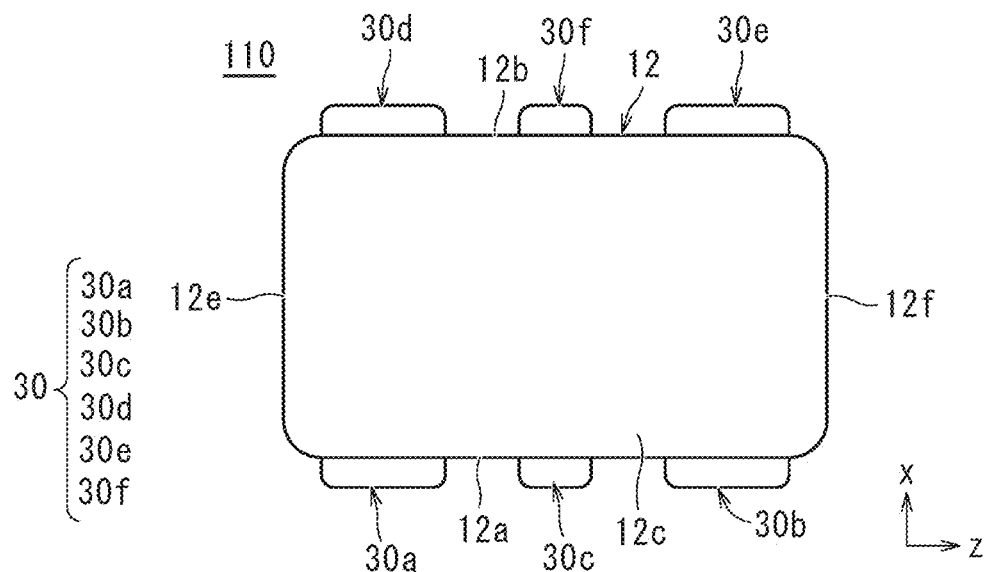
FIG. 11 is a front view illustrating the multilayer ceramic capacitor illustrated in FIG. 10.
Figure 12:
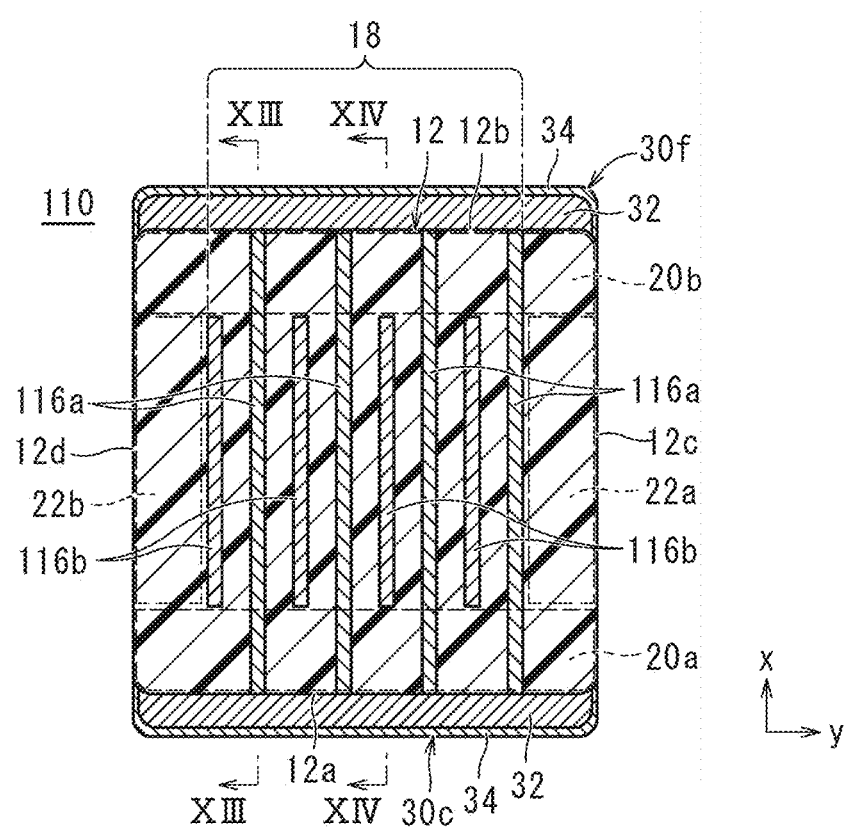
FIG. 12 is a sectional view taken along line XII-XII of the multilayer ceramic capacitor illustrated in FIG. 11.
Figure 13:
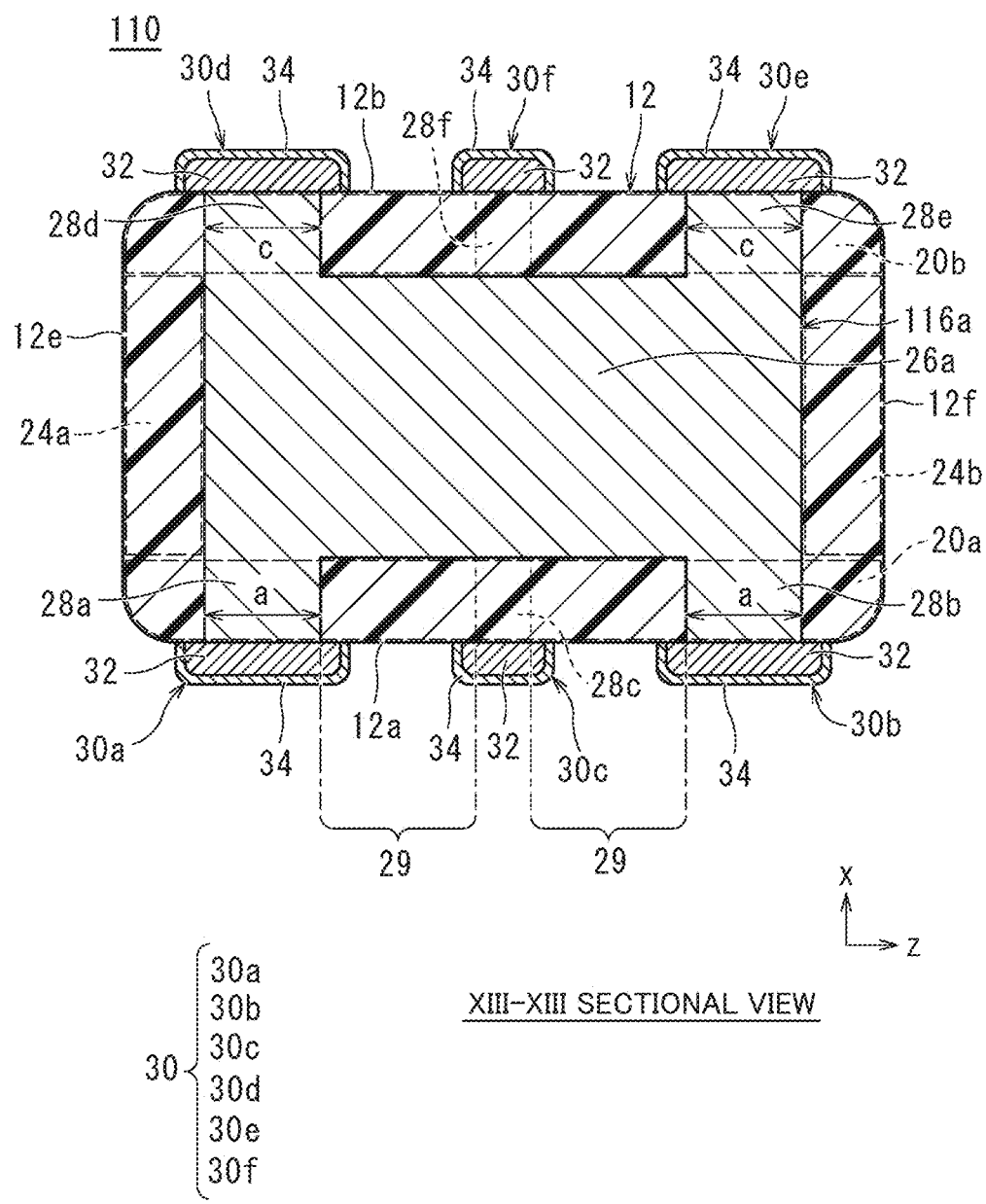
FIG. 13 is a sectional view taken along line XIII-XIII of the multilayer ceramic capacitor illustrated in FIG. 12.
Figure 14:
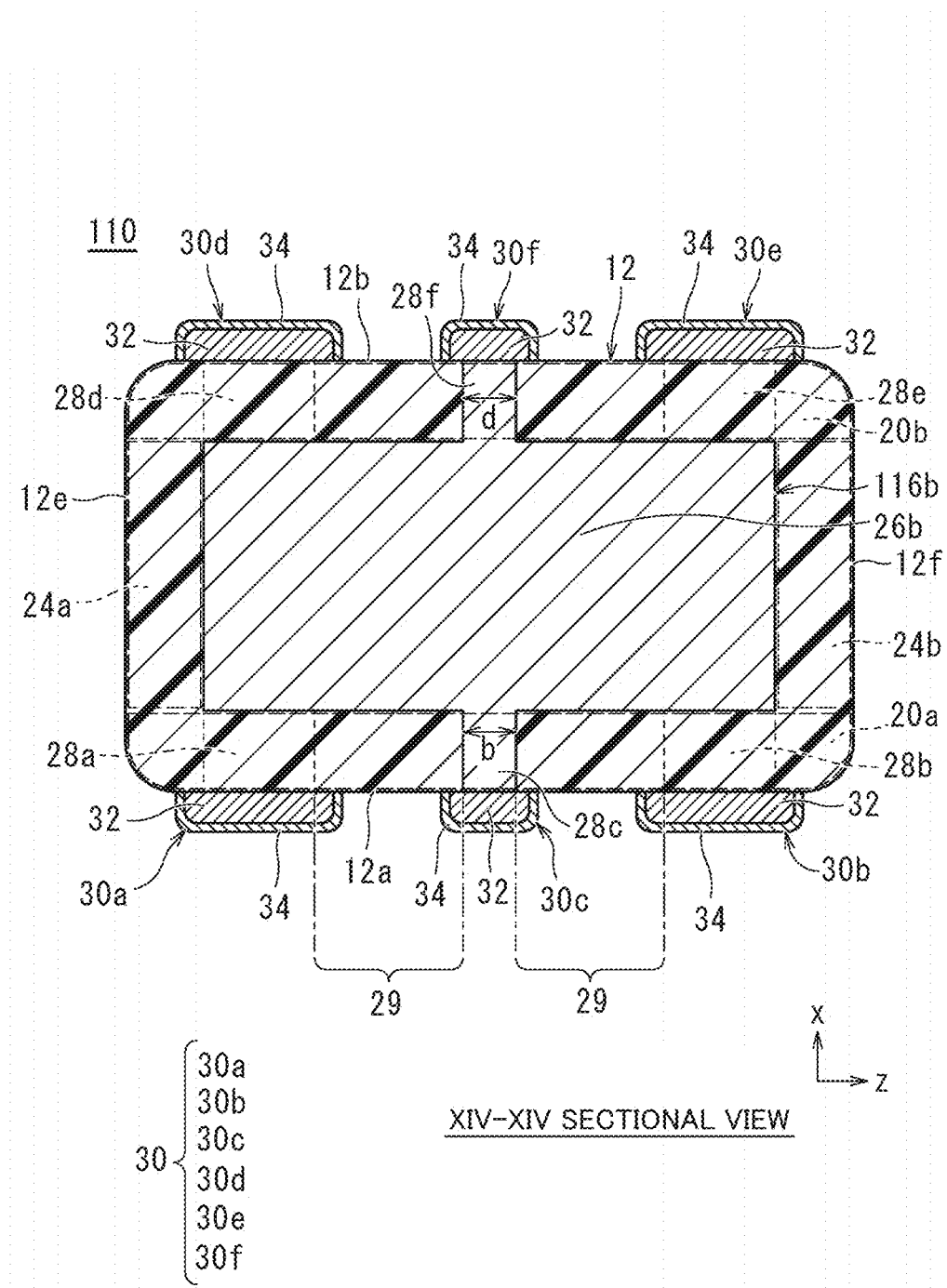
FIG. 14 is a sectional view taken along line XIV-XIV of the multilayer ceramic capacitor illustrated in FIG. 12.
Figure 15:
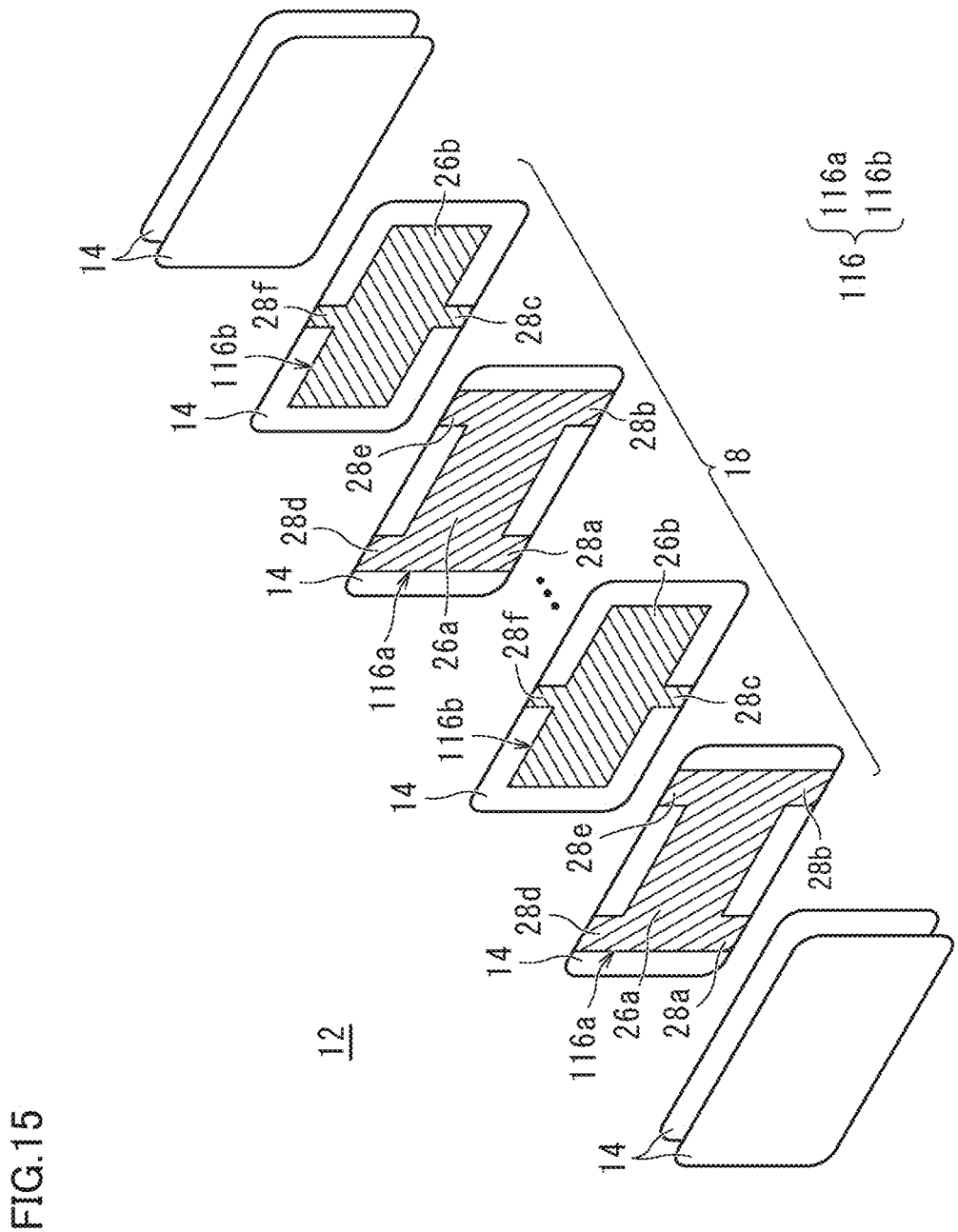
FIG. 15 is an exploded perspective view illustrating a multilayer body of a multilayer ceramic capacitor according to the second preferred embodiment of the present invention.

FIG. 10 is an external perspective view illustrating a multilayer ceramic capacitor according to a second preferred embodiment of the present invention. FIG. 11 is a front view illustrating the multilayer ceramic capacitor illustrated in FIG. 10. FIG. 12 is a sectional view taken along line XII-XII of the multilayer ceramic capacitor illustrated in FIG. 11. FIG. 13 is a sectional view taken along line XIII-XIII of the multilayer ceramic capacitor illustrated in FIG. 12. FIG. 14 is a sectional view taken along line XIV-XIV of the multilayer ceramic capacitor illustrated in FIG. 12. FIG. 15 is an exploded perspective view illustrating a multilayer body of a multilayer ceramic capacitor according to a second preferred embodiment of the present invention.

In the multilayer ceramic capacitor 110 illustrated in FIGS. 10 to 15, the same or corresponding portions as those of the multilayer ceramic capacitor 10 illustrated in FIGS. 1 to 6 are denoted by the same reference numerals, and the description thereof will not be repeated.

The configuration of the multilayer ceramic capacitor 110 illustrated in FIGS. 10 to 14 differs from the configuration of the multilayer ceramic capacitor 10 illustrated in FIGS. 1 to 6 in that an outer electrode 30 is provided on both the first main surface 12a and the second main surface 12b.

The multilayer ceramic capacitor 110 includes a multilayer body 12 and an outer electrode 30.

The multilayer body 12 includes a plurality of dielectric layers 14 and a plurality of inner electrode layers 116.

In the multilayer body 12, the plurality of inner electrode layers 116 are stacked with the dielectric layer 14 interposed therebetween in the width direction y connecting the first side surface 12c and the second side surface 12d.

Outer Electrode Layer

In addition to the first outer electrode 30a, the second outer electrode 30b and the third outer electrode 30c, the outer electrode 30 further includes a fourth outer electrode 30d, a fifth outer electrode 30e, and a sixth outer electrode 30f.

The fourth outer electrode 30d is provided on the first main surface 12a or the second main surface 12b on which the first outer electrode 30a, the second outer electrode 30b and the third outer electrode 30c are not provided, and is closer to the first end surface 12e than to the second end surface 12f. The fourth outer electrode 30d is connected to a fourth lead electrode 28d of a first inner electrode layer 116a, which will be described later.

The fourth outer electrode 30d is provided on the first main surface 12a or the second main surface 12b on which the first outer electrode 30a, the second outer electrode 30b and the third outer electrode 30c are not provided, and extends in the width direction y connecting the first side surface 12c and the second side surface 12d and in the length direction z connecting the first end surface 12e and the second end surface 12f. The fourth outer electrode 30d has a length equal or substantially equal to the length of the multilayer body 12 in the width direction y connecting the first side surface 12c and the second side surface 12d.

The length of the fourth outer electrode 30d in the width direction y connecting the first side surface 12c and the second side surface 12d is not particularly limited.

It is preferable that the length of the fourth outer electrode 30d in the length direction z connecting the first end surface 12e and the second end surface 12f is equal or substantially equal to the length of the fourth lead electrode 28d of the first inner electrode layer 116a in the length direction z connecting the first end surface 12e and the second end surface 12f. More specifically, the length of the fourth outer electrode 30d in the length direction z connecting the first end surface 12e and the second end surface 12f is equal or substantially equal to the sum of the length of the fourth lead electrode 28d of the first inner electrode layer 116a in the length direction z connecting the first end surface 12e and the second end surface 12f and the thickness of the fourth outer electrode 30d. Therefore, the length of the fourth outer electrode 30d in the length direction z connecting the first end surface 12e and the second end surface 12f is greater than the length of the sixth outer electrode 30f in the length direction z connecting the first end surface 12e and the second end surface 12f, which will be described later.

The fifth outer electrode 30e is provided on the first main surface 12a or the second main surface 12b on which the first outer electrode 30a, the second outer electrode 30b and the third outer electrode 30c are not provided, and is closer to the second end surface 12f than to the first end surface 12e. The fifth outer electrode 30e is connected to a fifth lead electrode 28e of a first inner electrode layer 116a, which will be described later.

The fifth outer electrode 30e is provided on the first main surface 12a or the second main surface 12b, and extends in the width direction y connecting the first side surface 12c and the second side surface 12d and in the length direction z connecting the first end surface 12e and the second end surface 12f. The fifth outer electrode 30e has a length equal or substantially equal to the length of the multilayer body 12 in the width direction y connecting the first side surface 12c and the second side surface 12d.

The length in the width direction y connecting the first side surface 12c and the second side surface 12d of the fifth outer electrode 30e is not particularly limited.

It is preferable that the length of the fifth outer electrode 30e in the length direction z connecting the first end surface 12e and the second end surface 12f is equal or substantially equal to the length of the fifth lead electrode 28e of the first inner electrode layer 116a in the length direction z connecting the first end surface 12e and the second end surface 12f. More specifically, the length of the fifth outer electrode 30e in the length direction z connecting the first end surface 12e and the second end surface 12f is equal or substantially equal to the sum of the length of the fifth lead electrode 28e of the first inner electrode layer 116a in the length direction z connecting the first end surface 12e and the second end surface 12f and the thickness of the fifth outer electrode 30e. Therefore, the length of the fifth outer electrode 30e in the length direction z connecting the first end surface 12e and the second end surface 12f is greater than the length of the sixth outer electrode 30f in the length direction z connecting the first end surface 12e and the second end surface 12f, which will be described later.

The sixth outer electrode 30f is provided on the first main surface 12a or the second main surface 12b on which the first outer electrode 30a, the second outer electrode 30b and the third outer electrode 30c are not provided, and is between the fourth outer electrode 30d and the fifth outer electrode 30e. The sixth outer electrode 30f is connected to a sixth lead electrode 28f of a second inner electrode layer 116b, which will be described later.

It is preferable that the length of the sixth outer electrode 30f in the length direction z connecting the first end surface 12e and the second end surface 12f is equal or substantially equal to the length of the sixth lead electrode 28f of the second inner electrode layer 116b in the length direction z connecting the first end surface 12e and the second end surface 12f. More specifically, the length of the sixth outer electrode 30f in the length direction z connecting the first end surface 12e and the second end surface 12f is equal or substantially equal to the sum of the length of the sixth lead electrode 28f of the second inner electrode layer 116b in the length direction z connecting the first end surface 12e and the second end surface 12f and the thickness of the sixth outer electrode 30f. Therefore, the length of the sixth outer electrode 30f in the length direction z connecting the first end surface 12e and the second end surface 12f is greater than the length of the sixth outer electrode 30f in the length direction z connecting the first end surface 12e and the second end surface 12f and the length of the fifth outer electrode 30e in the length direction z connecting the first end surface 12e and the second end surface 12f.

Hereinafter, a multilayer ceramic capacitor according to a modification of the second preferred embodiment will be described.

Figure 16:
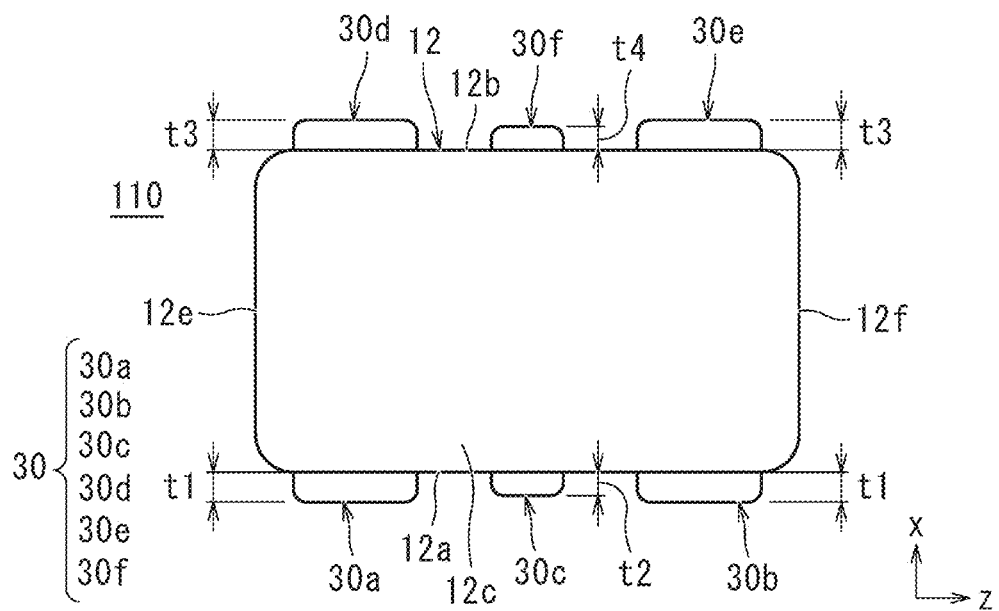
FIG. 16 is a front view illustrating a multilayer ceramic capacitor according to a modification of the second preferred embodiment of the present invention.

FIG. 16 is a front view illustrating a multilayer ceramic capacitor according to a modification of the second preferred embodiment of the present invention.

In the modification to be described hereinafter, the components corresponding to those in the second preferred embodiment are denoted by the same reference numerals, and the detailed description thereof will not be repeated.

In the present modification as illustrated in FIG. 16, it is preferable that when the thickness of the first outer electrode 30a in the height direction x connecting the first main surface 12a and the second main surface 12b and the thickness of the second outer electrode 30b in the height direction x connecting the first main surface 12a and the second main surface 12b are each denoted by t1, and the thickness of the third outer electrode 30c in the height direction x connecting the first main surface 12a and the second main surface 12b is denoted by t2, t1>t2, and when the thickness of the fourth outer electrode 30d in the height direction x connecting the first main surface 12a and the second main surface 12b and the thickness of the fifth outer electrode 30e in the height direction x connecting the first main surface 12a and the second main surface 12b are each denoted by t3, and the thickness of the sixth outer electrode 30f in the height direction x connecting the first main surface 12a and the second main surface 12b is denoted by t4, then t3>t4. Thus, when the multilayer ceramic capacitor 110 is mounted on a substrate using both of the first main surface 12a and the second main surface 12b as the mounting surface, the third outer electrode 30c is prevented from becoming a fulcrum, which makes it possible to prevent the multilayer ceramic capacitor 10 from being mounted in a tilted state or to prevent the third outer electrode 30c from being improperly connected to the mounting land on the mounting substrate, and thus it is possible to avoid an improper connection (open failure) and obtain a high mounting stability.

A multilayer ceramic capacitor according to another modification of the second preferred embodiment will be described.

Figure 17:
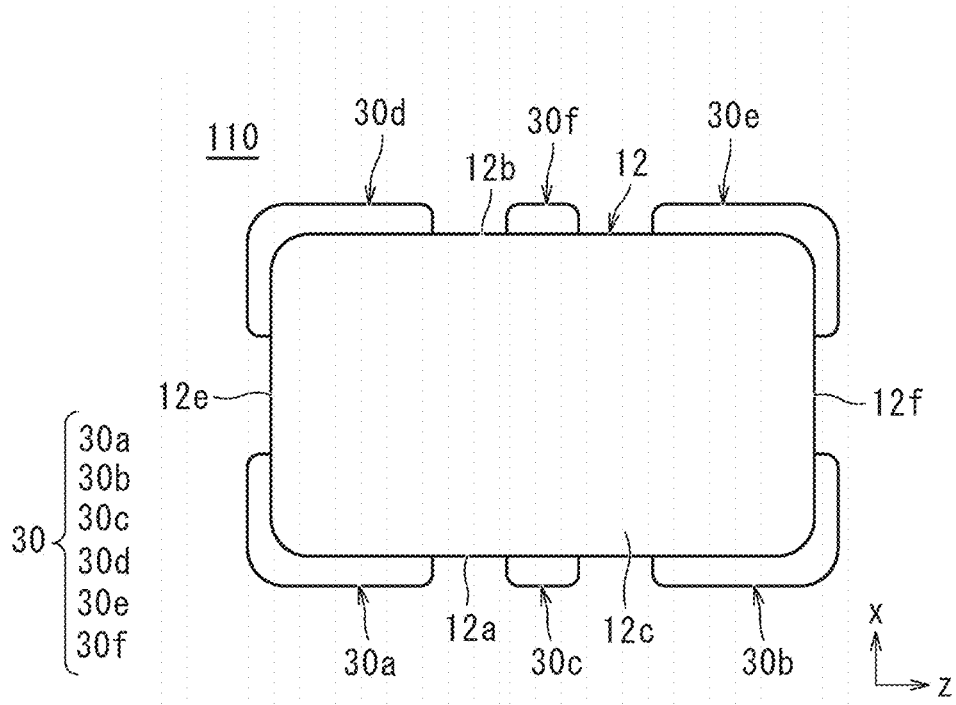
FIG. 17 is a front view illustrating a multilayer ceramic capacitor according to another modification of the second preferred embodiment of the present invention.

FIG. 17 is a front view illustrating a multilayer ceramic capacitor according to another modification of the second preferred embodiment of the present invention.

The fourth outer electrode 30d may extend from the first main surface 12a or the second main surface 12b onto the first end surface 12e. As a result, the solder may wet up to a portion of the end surface during mounting, which makes the mounting posture more stable.

The fifth outer electrode 30e may extend from the first main surface 12a or the second main surface 12b onto the first end surface 12e. As a result, the solder may wet up to a portion of the end surface during mounting, which makes the mounting posture more stable.

Each of the first outer electrode 30a, the second outer electrode 30b, the third outer electrode 30c, the fourth outer electrode 30d, the fifth outer electrode 30e, and the sixth outer electrode 30f includes a base electrode layer 32 and a plating layer 34 in order from the side of the multilayer body 12.

In other words, the outer electrode 30 includes a base electrode layer 32 including a metal component and a glass component, and a plating layer 34 on the surface of the base electrode layer 32.

Inner Electrode Layer

The inner electrode layer 116 includes a plurality of first inner electrode layers 116a and a plurality of second inner electrode layers 116b.

The first inner electrode layers 116a are provided on the plurality of dielectric layers 14, and connected to the first outer electrode 30a, the second outer electrode 30b, the fourth outer electrode 30d and the fifth outer electrode 30e.

The second inner electrode layers 116b are provided on the plurality of dielectric layers 14, and connected to the third outer electrode 30c and the sixth outer electrode 30f.

The first inner electrode layer 116a includes a first counter electrode 26a opposed to the second inner electrode layer 116b, a first lead electrode 28a extending from the first counter electrode 26a so as to be connected to the first outer electrode 30a, and a second lead electrode 28b extending from the first counter electrode 26a so as to be connected to the second outer electrode 30b.

The first inner electrode layer 116a further includes a fourth lead electrode 28d extending from the first counter electrode 26a so as to be connected to the fourth outer electrode 30d, and a fifth lead electrode 28e extending from the first counter electrode 26a so as to be connected to the fifth outer electrode 30e.

The second inner electrode layer 116b includes a second counter electrode 26b opposed to the first inner electrode layer 116a, and a third lead electrode 28c extending from the second counter electrode 26b so as to be connected to the third outer electrode 30c.

The second inner electrode layer 116b further includes a sixth lead electrode 28f extending from the second counter electrode 26b so as to be connected to the sixth outer electrode 30f.

When the length of the fourth lead electrode 28d and the length of the fifth lead electrode 28e in the length direction z connecting the first end surface 12e and the second end surface 12f are each denoted by c, and the length of the sixth lead electrode 28f in the length direction z connecting the first end surface 12e and the second end surface 12f is denoted by d, c/d is preferably about 0.5 or more and about 0.83 or less, for example. Thus, the wiring distance between the first lead electrode 28a and the third lead electrode 28c and the wiring distance between the second lead electrode 28b and the third lead electrode 28c are shortened, such that the loop inductance is reduced, which makes it possible to reduce the equivalent series inductance (ESL). Moreover, since the length of the third lead electrode 28c in the length direction z connecting the first end surface 12e and the second end surface 12f is smaller than the length of the first lead electrode 28a and the length of the second lead electrode 28b in the length direction z connecting the first end surface 12e and the second end surface 12f, the thickness of the third outer electrode 30c corresponding to the third lead electrode 28c may be reduced. As a result, it is possible to prevent the multilayer ceramic capacitor 110 from being mounted in a tilted state, which makes it possible to reliably connect the outer electrode 30 to the mounting land so as to prevent the occurrence of an improper connection (open failure). Furthermore, by setting the parameters within the numerical range of preferred embodiments of the present invention, it is possible for the inner electrode layer 116 to be printed properly or uniformly in thickness, which makes it possible to prevent an improper connection from being provided between the outer electrode 30 and the lead electrode of the inner electrode layer 116. As a result, it is possible to prevent the capacitance of the multilayer ceramic capacitor 110 from becoming insufficient.

When c/d is smaller than about 0.5, the width of the fourth lead electrode 28d and the width of the fifth lead electrode 28e become greater, and it is impossible to sufficiently ensure the distance between the fourth lead electrode 28d and the sixth lead electrode 28f and the distance between the fifth lead electrode 28e and the sixth lead electrode 28f, such that a short circuit may occur between the outer electrodes 30. If c/d is greater than about 0.83, when the outer electrode 30 is formed by the DIP method or the plating method, the thickness of the sixth outer electrode 30f may become greater than the thickness of the fourth outer electrode 30d and the thickness of the fifth outer electrode 30e, and the sixth outer electrode 30f may define and function as a fulcrum, such that the multilayer ceramic capacitor 110 may be mounted in a tilted state, or the sixth outer electrode 30f may be improperly connected to the mounting land on the mounting substrate, causing an improper connection (open failure). If c/d is further greater than about 3, the width of the fourth lead electrode 28d and the width of the fifth lead electrode 28e become excessively small, and the printing of the inner electrode layer 116 may become worse, such that the inner electrode layer 116 may be improperly connected to the outer electrode 30. As a result, the capacitance of the multilayer ceramic capacitor 110 may become insufficient.

In addition to the advantageous effects as those of the multilayer ceramic capacitor 10 illustrated in FIG. 1, the multilayer ceramic capacitor 110 illustrated in FIG. 10 has the following advantageous effects.

Specifically, in the multilayer ceramic capacitor 110, since the first outer electrode 30a, the second outer electrode 30b and the third outer electrode 30c are provided on the first main surface 12a of the multilayer body 12, and the fourth outer electrode 30d, the fifth outer electrode 30e and the sixth outer electrode 30f are provided on the second main surface 12b of the multilayer body 12, either the first main surface 12a or the second main surface 12b may be used as the mounting surface. Therefore, it is unnecessary to orient the multilayer ceramic capacitor during mounting. As a result, it is possible to efficiently mount the multilayer ceramic capacitor 110 on the mounting substrate.

2. Method of Manufacturing Multilayer Ceramic Capacitor

Hereinafter, a non-limiting example of a method of manufacturing the multilayer ceramic capacitor 10 according to the present preferred embodiment will be described. The manufacturing method is merely an example for manufacturing a multilayer ceramic capacitor according to a preferred embodiment described above, and is not intended to limit the present invention in any aspects.

First, a dielectric sheet for forming a dielectric layer and a conductive paste for forming an inner electrode layer are prepared. The dielectric sheet for forming a dielectric layer and the conductive paste for forming an inner electrode layer include a binder and a solvent. The binder and the solvent may be those known in the art, for example.

Next, the conductive paste for forming an inner electrode layer is printed on the dielectric sheet in a predetermined pattern by screen printing or gravure printing, for example. Thus, the dielectric sheet formed with the pattern of the first inner electrode layer 16a and the second inner electrode layer 16b is prepared.

More specifically, a printing plate formed with the printing pattern of the first inner electrode layer 16a and the second inner electrode layer 16b is prepared, and a printing machine is used to print the inner electrode layer 16.

In order to obtain a desired structure, the first inner electrode layer 16a and the second inner electrode layer 16b are stacked alternately such that the printed patterns overlap each other alternately, and the inner layer portion 18 is formed.

In order to form the first inner electrode layer 16a as illustrated in FIG. 5 and the second inner electrode layer 16b as illustrated in FIG. 6, the length a of the first lead electrode 28a in the length direction z connecting the first end surface 12e and the second end surface 12f, the length a of the second lead electrode 28b in the length direction z connecting the first end surface 12e and the second end surface 12f, and the length b of the third lead electrode 28c in the length direction z connecting the first end surface 12e and the second end surface 12f may be appropriately adjusted by designing the printing pattern of the printing plate.

In the case of manufacturing the multilayer ceramic capacitor 110, in order to form the first inner electrode layer 116a as illustrated in FIG. 13 and the second inner electrode layer 116b as illustrated in FIG. 14, the length a of the first lead electrode 28a in the length direction z connecting the first end surface 12e and the second end surface 12f, the length a of the second lead electrode 28b in the length direction z connecting the first end surface 12e and the second end surface 12f, the length b of the third lead electrode 28c in the length direction z connecting the first end surface 12e and the second end surface 12f, the length c of the fourth lead electrode 28d in the length direction z connecting the first end surface 12e and the second end surface 12f, the length c of the fifth lead electrode 28e in the length direction z connecting the first end surface 12e and the second end surface 12f and the length d of the sixth lead electrode 28f in the length direction z connecting the first end surface 12e and the second end surface 12f may be appropriately adjusted by designing the printing pattern of the printing plate.

Subsequently, a predetermined number of dielectric sheets on which the pattern of the inner electrode layer 16 is not printed are stacked to form the first side-surface outer layer portion 22a on the first side surface 12c. Thereafter, the inner layer portions 18 prepared in the above step are stacked, and a predetermined number of dielectric sheets on which the pattern of the inner electrode layer 16 is not printed are stacked on the stacked inner layer portion 18 to form the second side-surface outer layer portion 22b on the second side surface 12d. Thus, a multilayer sheet is produced.

Next, the multilayer sheet is pressed in the stacking direction by hydrostatic pressing or the like, for example, to produce a multilayer block.

Subsequently, the multilayer block is cut into a predetermined size to produce a multilayer chip. The corners and ridges of the multilayer chip may be rounded by barrel polishing or the like, for example.

Next, the multilayer chip is fired to produce a multilayer body 12. The firing temperature is dependent on the material of the dielectric layer 14 and the material of the inner electrode layer 16, but it is preferably about 900° C. or more and about 1400° C. or less, for example.

Baked Layer

Then, a base electrode layer 32 of the first outer electrode 30a, a base electrode layer 32 of the second outer electrode 30b, and a base electrode layer 32 of the third outer electrode 30c are formed on the exposed portion of the inner electrode layer 16 of the multilayer body 12.

In the case where the base electrode layer 32 is formed as a baked layer, a conductive paste including a glass component and a metal component is applied and baked to form the base electrode layer 32. The temperature of the baking treatment is preferably about 700° C. or more and about 900° C. or less, for example.

The baked layer may be formed by various methods. For example, the baked layer may be formed by applying a conductive paste by extruding the conductive paste through a slit. In this case, the base electrode layer 32 may be formed not only on the first main surface 12*a* but also on a portion of the first end surface 12*e* and a portion of the second end surface 12*f* by increasing the extruding amount of the conductive paste. The thickness may be controlled not only by adjusting the width of the lead electrode but also by adjusting the extruding amount of the conductive paste and the viscosity of the conductive paste.

Alternatively, the base electrode layer 32 may be formed by a roller transferring method. In this case, the base electrode layer 32 may be formed not only on the first main surface 12*a* or the second main surface 12*b* but also on a portion of the first end surface 12*e* and a portion of the second end surface 12*f* by increasing the pressing pressure of the transfer roller. The thickness may be controlled not only by adjusting the width of the lead electrode but also by adjusting the pressing pressure of the roller and the viscosity of the conductive paste.

Conductive Resin Layer

In the case where the base electrode layer 32 is formed as a conductive resin layer, the conductive resin layer may be formed by the following method, for example. The conductive resin layer may be formed on the surface of the baked layer, or the conductive resin layer may be formed directly on the multilayer body 12 without the baked layer.

As a method of forming the conductive resin layer, a conductive resin paste including a thermosetting resin and a metal component is coated on the baked layer or the multilayer body 12 and heated at a temperature of about 250° C. or more and about 550° C. or less to thermally cure the thermosetting resin so as to form the conductive resin layer. The atmosphere for the heat treatment is preferably $N_2$, for example. In order to prevent the scattering of the thermosetting resin and to prevent the oxidation of various metal components, the oxygen concentration is preferably about 100 ppm or less, for example.

The conductive resin paste may be applied, for example, by extruding the conductive paste through a slit or by the roller transferring method in the same or similar manner as forming the base electrode layer 32 as a baked layer.

Finally, the plating layer 34 is formed. The plating layer 34 may be formed on the surface of the base electrode layer 32, or may be formed directly on the multilayer body 12. In the present preferred embodiment, the plating layer 34 is formed on the surface of the base electrode layer 32. More specifically, an Ni plating layer (lower plating layer) and an Sn plating layer (upper plating layer) are formed on the base electrode layer 32. The plating treatment may be performed by either electrolytic plating or electroless plating. However, the electroless plating requires a pretreatment with a catalyst or the like so as to improve the plating rate, which disadvantageously makes the process complicated. Therefore, usually the electrolytic plating is preferably used.

Thus, the multilayer ceramic capacitor 10 illustrated in FIG. 1 is manufactured.

3. Experimental Examples

The multilayer ceramic capacitor illustrated in FIGS. 1 to 6 was manufactured as a multilayer ceramic electronic component according to the manufacturing method described above, and the ESL measurement, and the connection quality test, the short circuit check of outer electrodes, and the mounting quality test were performed.

(1) Specification of a Multilayer Ceramic Capacitor Manufactured as an Experimental Example A multilayer ceramic capacitor 10 having the structure illustrated in FIGS. 1 to 6 and having the following specifications was manufactured according to the manufacturing method as described in the present preferred embodiment:

Dimensions of the multilayer ceramic capacitor: L×W×T=about 1.12 mm×about 0.62 mm×about 0.62 mm Dielectric layer material: $BaTiO_3$ Capacity: about 10 μF Rated voltage: about 6.3V Inner electrode layer: Ni When the length of the first lead electrode and the length of the second lead electrode of the first inner electrode layer in the length direction z connecting the first end surface and the second end surface are each denoted by a, the length of the third lead electrode of the second inner electrode layer in the length direction z connecting the first end surface and the second end surface, the ratio of b/a is listed in Table 1.

The outer electrode includes:

a base electrode layer: a baked layer including a conductive metal (Cu) and a glass component thickness of baked layer: about 10 μm to about 30 μm a metal layer formed of plating layers and having a two-layered structure of an Ni plating layer and an Sn plating layer thickness of Ni plating layer: about 5 μm thickness of Sn plating layer: about 5 μm (2) Measurement and Evaluation (a) Measurement of ESL The ESL was measured as follows. After the chip was mounted on the mounting substrate, the substrate mounted with the chip was subjected to a heat pretreatment (at about 150° C. for about 60 minutes), and was allowed to stand for about 24 hours. The S parameter was measured at a measurement frequency of about 9 kHz to about 9 GHz by using a network analyzer, and the ESL value at about 1 GHz was calculated. For each sample number, 5 samples were measured, and an average thereof was calculated as the ESL value. The lower the ESL value is (specifically, the ESL value is about 95 pH or lower), the better the multilayer ceramic capacitor is.

(b) Bonding Quality Between Inner Electrode Layer and Outer Electrode

The bonding quality between the inner electrode layer and the outer electrode was determined as follows. The multilayer ceramic capacitor was subjected to a heat treatment (at about 150° C. for about 60 minutes), and was allowed to stand for about 24 hours. The capacitance was measured with a C meter at a measurement frequency of about 1 kHz and a measurement voltage of about 0.5 V. For each sample number, 20 samples were measured, and an average thereof was calculated as the capacitance. If the capacitance is about 8 μF or less, the multilayer ceramic capacitor was determined to have an improper connection and labeled as "poor", otherwise it was labeled as "good".

(c) Short-Circuit Between Outer Electrodes

The short-circuit between the outer electrodes was determined as follows. The multilayer ceramic capacitor was subjected to a heat treatment (at about 150° C. for about 60 minutes), and was allowed to stand for about 24 hours. The measurement was performed with a C meter at a measurement frequency of about 1 kHz and a measurement voltage of about 0.5 V. The short-circuit between the outer electrodes was determined by observing the outer appearance of the multilayer ceramic capacitor. If a short-circuit was observed, the multilayer ceramic capacitor was determined to be defective and labeled as "poor", otherwise it was labeled as "good".

(g) Measurement of Thickness of Outer Electrode

The cross section of the multilayer ceramic capacitor was polished along the side surface to a position of about ½ W to expose the LT surface. The thickness of the central portion of the first outer electrode in the width direction y and the thickness of the central portion of the second outer electrode in the width direction y were measured in the exposed cross-section, and an average value of 20 samples for each sample number was calculated and denoted by t1. The thickness of the central portion in the width direction y of the third outer electrode was measured in the exposed cross section, and an average value of 20 of the samples for each sample number was calculated and denoted by t2.

Table 1 illustrates the measurement results and experimental results for each sample.

TABLE 1

| Sample No. | Dimension L (mm) | Dimension W (mm) | Dimension a (mm) | Dimension b (mm) | b/a | L gap (mm) | Gap between inner electrode layers (mm) | t1 (μm) | t2 (μm) | ESL (pH) | Bonding quality between inner electrode layer and outer electrode | Presence of short-circuit between outer electrodes | Mounting quality |
|---|---|---|---|---|---|---|---|---|---|---|---|---|---|
| 1 | 1.12 | 0.62 | 0.05 | 0.15 | 3.00 | 0.06 | 0.375 | 17.7 | 28.2 | 104.44 | poor | good | poor |
| 2 | 1.12 | 0.62 | 0.06 | 0.15 | 2.50 | 0.06 | 0.365 | 19.0 | 28.2 | 103.61 | good | good | poor |
| 3 | 1.12 | 0.62 | 0.08 | 0.15 | 1.88 | 0.06 | 0.345 | 21.4 | 28.2 | 101.95 | good | good | poor |
| 4 | 1.12 | 0.62 | 0.10 | 0.15 | 1.50 | 0.06 | 0.325 | 23.6 | 28.2 | 100.29 | good | good | poor |
| 5 | 1.12 | 0.62 | 0.12 | 0.15 | 1.25 | 0.06 | 0.305 | 25.5 | 28.2 | 98.64 | good | good | poor |
| 6 | 1.12 | 0.62 | 0.15 | 0.15 | 1.00 | 0.06 | 0.275 | 28.2 | 28.2 | 96.15 | good | good | poor |
| 7 | 1.12 | 0.02 | 0.18 | 0.15 | 0.83 | 0.00 | 0.245 | 30.6 | 28.2 | 93.66 | good | good | good |
| 8 | 1.12 | 0.62 | 0.21 | 0.15 | 0.71 | 0.06 | 0.215 | 32.8 | 28.2 | 91.18 | good | good | good |
| 9 | 1.12 | 0.62 | 0.25 | 0.15 | 0.60 | 0.06 | 0.175 | 35.3 | 28.2 | 87.86 | good | good | good |
| 10 | 1.12 | 0.62 | 0.30 | 0.15 | 0.50 | 0.06 | 0.125 | 38.2 | 28.2 | 83.72 | good | good | good |
| 11 | 1.12 | 0.62 | 0.35 | 0.15 | 0.43 | 0.06 | 0.075 | 40.8 | 28.2 | 79.57 | good | poor | good |
| 12 | 1.12 | 0.62 | 0.40 | 0.15 | 0.38 | 0.06 | 0.025 | 43.0 | 28.2 | — | good | poor | good |

(d) Evaluation of Mounting Quality

The mounting quality was evaluated as follows. Reflow solder was printed on a mounting substrate using a metal mask having a mask thickness of about 60 μm to mount a multilayer ceramic capacitor. For each sample number, 100 samples were mounted on the mounting substrate, and the presence or absence of improper connection (open failure) was determined by observing the outer appearance. If an improper connection (open failure) was observed in a sample due to the inclination with respect to the mounting substrate, the sample was determined to be defective and labeled as "poor", otherwise it was labeled as "good".

(e) Measurement of Dimension a and Dimension b

The cross section of the multilayer ceramic capacitor was polished along the side surface to a position of ½ W to expose the LT surface. At this time, a surface to expose the first inner electrode layer and a surface to expose the second inner electrode layer were obtained, and the dimensions a and b were measured using an optical microscope. For each sample number, the dimensions of 20 samples were measured, and an average thereof was calculated as dimension a and dimension b, respectively.

(f) Measurement of Dimension L and Dimension W of Each Sample Multilayer Ceramic Capacitor The dimensions of each multilayer ceramic capacitor was measured by using a micrometer. For each sample number, the dimensions of 20 samples were measured, and an average thereof was calculated as dimension L and dimension W, respectively.

(3) Experimental Results

As shown in Table 1, in the samples of sample No. 7 to sample No. 10, since b/a was about 0.50 or more and about 0.83 or less and the measured ESL was about 95 pH or less, good results were obtained. Further, in the samples of sample No. 7 to sample No. 10, since b/a is about 0.50 or more and about 0.83 or less, the distance between the first outer electrode or the second outer electrode and the third outer electrode was ensured, and no short circuit was observed between the outer electrodes. Furthermore, in the samples of sample No. 7 to sample No. 10, since t1>t2, no improper connection (open failure) occurs in the sample mounting substrate, and good mounting quality was obtained.

On the other hand, as shown in Table 1, in the sample of Sample No. 1, since b/a was about 3.00 and the dimension a was too narrow, the printing of the lead electrode of the inner electrode layer was poor, and the bonding between the inner electrode layer and the outer electrode was poor.

Further, in the sample of Sample No. 11, since b/a was about 0.43 or less, the distance between the first outer electrode or the second outer electrode and the third outer electrode was not secured, the distance between the inner electrode interlayer gaps was about 0.1 mm or less, and a short circuit was observed between the outer electrodes.

Furthermore, in the samples of sample No. 1 to sample No. 6, since t1≤t2, had an improper connection (open failure) was observed in the sample mounting substrate.

The sample of sample No. 12 was not obtained as a non-defective product, and thereby the ESL thereof was not measured. Further, in the sample of Sample No. 12, s since b/a was about 0.43 or less, the distance between the first outer electrode or the second outer electrode and the third outer electrode was not secured, the distance between the inner electrode interlayer gaps was about 0.1 mm or less, and a short circuit was observed between the outer electrodes.

From the above results, in preferred embodiments of the present invention, the length a of the first lead electrode and the length a of the second lead electrode of the first inner electrode layer in the length direction z connecting the first end surface and the second end surface are greater than the length b of the third lead electrode of the second inner electrode layer in the length direction z connecting the first end surface and the second end surface, and b/a is about 0.5 or more and about 0.83 or less, for example. As a result, the wiring distance between the first lead electrode and the third lead electrode and the wiring distance between the second lead electrode and the third lead electrode are shortened, such that the loop inductance is reduced, which makes it possible to reduce the equivalent series inductance (ESL).

Further, since the length of the third lead electrode in the length direction connecting the first end surface and the second end surface is smaller than the length of the first lead electrode and the length of the second lead electrode in the length direction connecting the first end surface and the second end surface, the thickness of the third outer electrode corresponding to the third lead electrode may be reduced. As a result, it is possible to prevent the multilayer ceramic capacitor from being mounted in a tilted state, which makes it possible to reliably connect the outer electrode to the mounting land so as to prevent the occurrence of an improper connection (open failure).

Furthermore, by setting the parameters within the numerical range of preferred embodiments of the present invention, it is possible for the inner electrode layer to be printed properly or uniformly in thickness, which makes it possible to prevent an improper connection from being formed between the outer electrode and the lead electrode of the inner electrode layer. As a result, it is possible to prevent the capacitance of the multilayer ceramic capacitor from becoming insufficient.

In addition, when the thickness of the first outer electrode in the height direction connecting the first main surface and the second main surface and the thickness of the second outer electrode in the height direction connecting the first main surface and the second main surface are each denoted by t1, and the thickness of the third outer electrode in the height direction connecting the first main surface and the second main surface is denoted by t2, t1>t2, it is obvious that no improper connection (open failure) is present between the outer electrode and the mounting substrate, and good mounting property is obtained.

The preferred embodiments of the present invention have been described in the above, but the present invention is not limited thereto.

For example, the outer shape of the multilayer ceramic capacitor according to the present invention may be changed in accordance with the mounting substrate and the required performance. Further, the present invention includes an appropriate combination of all or a portion of the structures in the preferred embodiments described above and modifications.

In other words, various changes may be made to the mechanism, shape, material, quantity, position, arrangement or the like in the preferred embodiments described above and modifications without departing from the technical idea and the scope of the present invention, and these are included in the present invention.

Preferred embodiments of the present invention may be used as a multilayer ceramic capacitor, for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
a multilayer body including a plurality of dielectric layers that are stacked, the multilayer body including a first main surface and a second main surface opposite to each other in a height direction, a first side surface and a second side surface opposite to each other in a width direction orthogonal or substantially orthogonal to the height direction, and a first end surface and a second end surface opposite to each other in a length direction orthogonal or substantially orthogonal to the height direction and the width direction;
a first outer electrode on at least one of the first main surface or the second main surface and closer to the first end surface than to the second end surface;
a second outer electrode on at least one of the first main surface or the second main surface and closer to the second end surface than to the first end surface;
a third outer electrode on at least one of the first main surface or the second main surface and between the first outer electrode and the second outer electrode;
a first inner electrode layer on the plurality of dielectric layers and connected to the first outer electrode and the second outer electrode; and
a second inner electrode layer on the plurality of dielectric layers and connected to the third outer electrode; wherein
the first inner electrode layer includes:
  a first counter electrode opposed to the second inner electrode layer;
  a first lead electrode extending from the first counter electrode so as to be connected to the first outer electrode; and
  a second lead electrode extending from the first counter electrode so as to be connected to the second outer electrode;
the second inner electrode layer includes:
  a second counter electrode opposed to the first inner electrode layer; and
  a third lead electrode extending from the second counter electrode so as to be connected to the third outer electrode;
when a length of the first lead electrode and a length of the second lead electrode in the length direction connecting the first end surface and the second end surface are each denoted by a, and a length of the third lead electrode in the length direction connecting the first end surface and the second end surface is denoted by b, a is greater than b;
a length of the third outer electrode in the length direction connecting the first end surface and the second end surface is less than a length of each of the first outer electrode and the second outer electrode in the length direction connecting the first end surface and the second end surface; and when a thickness of the first outer electrode protruding from the at least one of the first main surface or the second main surface in the height direction connecting the first main surface and the second main surface and a thickness of the second outer electrode protruding from the at least one of the first main surface or the second main surface in the height direction connecting the first main surface and the second main surface are each denoted by t1, and a thickness of the third outer electrode protruding from the at least one of the first main surface or the second main surface in the height direction connecting the first main surface and the second main surface is denoted by t2, t1>t2.

2. The multilayer ceramic capacitor according to claim 1, wherein
the first outer electrode extends onto the first end surface; and
the second outer electrode extends onto the second end surface.

3. The multilayer ceramic capacitor according to claim 1 further comprises:
a fourth outer electrode on the first main surface or the second main surface on which the first outer electrode, the second outer electrode and the third outer electrode are not provided, and closer to the first end surface than to the second end surface;
a fifth outer electrode on the first main surface or the second main surface on which the first outer electrode, the second outer electrode and the third outer electrode are not provided, and closer to the second end surface than to the first end surface; and
a sixth outer electrode on the first main surface or the second main surface on which the first outer electrode, the second outer electrode and the third outer electrode are not provided, and between the fourth outer electrode and the fifth outer electrode; wherein
the first inner electrode layer includes a fourth lead electrode extending from the first counter electrode so as to be connected to the fourth outer electrode, and a fifth lead electrode extending from the first counter electrode so as to be connected to the fifth outer electrode;
the second inner electrode layer includes a sixth lead electrode extending from the second counter electrode so as to be connected to the sixth outer electrode;
when a length of the fourth lead electrode and a length of the fifth lead electrode in the length direction connecting the first end surface and the second end surface are each denoted by c, and a length of the sixth lead electrode in the length direction connecting the first end surface and the second end surface is denoted by d, c/d is about 0.5 or more and about 0.83 or less.

4. The multilayer ceramic capacitor according to claim 3, wherein, when a thickness of the fourth outer electrode in the height direction connecting the first main surface and the second main surface and a thickness of the fifth outer electrode in the height direction connecting the first main surface and the second main surface are each denoted by t3, and a thickness of the sixth outer electrode in the height direction connecting the first main surface and the second main surface is denoted by t4, t3>t4.

5. The multilayer ceramic capacitor according to claim 3, wherein
the fourth outer electrode extends onto the first end surface; and
the fifth outer electrode extends onto the second end surface.

6. The multilayer ceramic capacitor according to claim 3, wherein
a length of the fourth outer electrode in the length direction is equal or substantially equal to the length of the fourth lead electrode of the first inner electrode layer in the length direction;
a length of the fifth outer electrode in the length direction is equal or substantially equal to the length of the fifth lead electrode of the first inner electrode layer in the length direction; and
a length of the sixth outer electrode in the length direction is equal or substantially equal to the length of the sixth lead electrode of the second inner electrode layer in the length direction.

7. The multilayer ceramic capacitor according to claim 1, wherein the multilayer body includes rounded corners and edges.

8. The multilayer ceramic capacitor according to claim 1, wherein a number of the plurality of dielectric layers is 15 or more and 700 or less.

9. The multilayer ceramic capacitor according to claim 1, wherein a thickness of each of the plurality of dielectric layers is about 0.4 μm or more and about 10 μm or less.

10. The multilayer ceramic capacitor according to claim 1, wherein each of the plurality of dielectric layers is made of a dielectric ceramic including $BaTiO_3$, $CaTiO_3$, $SrTiO_3$, or $CaZnO_3$ as a main component.

11. The multilayer ceramic capacitor according to claim 1, wherein a dimension of the multilayer body in the length direction is about 0.2 mm or more and about 10 mm or less, a dimension of the multilayer body in the width direction is about 0.1 mm or more and about 10 mm or less, and a dimension of the multilayer body in the height direction is about 0.1 mm or more and about 5 mm or less.

12. The multilayer ceramic capacitor according to claim 1, wherein
the length of the first outer electrode in the length direction is equal or substantially equal to the length of the first lead electrode of the first inner electrode layer in the length direction;
the length of the second outer electrode in the length direction is equal or substantially equal to the length of the second lead electrode of the first inner electrode layer in the length direction; and
the length of the third outer electrode in the length direction is equal or substantially equal to the length of the third lead electrode of the second inner electrode layer in the length direction.

13. The multilayer ceramic capacitor according to claim 1, wherein each of the first, second, and third outer electrodes includes a base electrode layer and a plating layer on the base electrode layer.

14. The multilayer ceramic capacitor according to claim 13, wherein the base electrode layer includes a metal component and a glass component.

15. The multilayer ceramic capacitor according to claim 14, wherein the glass component includes at least one of B, Si, Ba, Mg, Al, or Li, and the metal component includes at least one of Cu, Ni, Ag, Pd, Ag—Pd alloy, or Au.

16. The multilayer ceramic capacitor according to claim 13, wherein a thickness of the base electrode layer in a central portion thereof is about 5 μm or more and about 150 μm or less.

17. The multilayer ceramic capacitor according to claim 13, wherein the plating layer includes a Ni plating layer on the base electrode layer and an Sn plating layer on the Ni plating layer.

18. The multilayer ceramic capacitor according to claim 13, wherein the plating layer includes at least one of Cu, Ni, Sn, Pd, Ag—Pd alloy, or Au.

* * * * *